United States Patent
Sugeno et al.

(10) Patent No.: US 10,283,820 B2
(45) Date of Patent: May 7, 2019

(54) ELECTRICAL STORAGE SYSTEM, CONTROLLER, AND STORAGE BATTERY CHARGING AND DISCHARGING METHOD

(71) Applicant: Murata Manufacturing Co., Ltd., Kyoto (JP)

(72) Inventors: Naoyuki Sugeno, Fukushima (JP); Yukio Miyaki, Fukushima (JP); Kohki Watanabe, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/565,821

(22) PCT Filed: May 10, 2016

(86) PCT No.: PCT/JP2016/002298
§ 371 (c)(1),
(2) Date: Oct. 11, 2017

(87) PCT Pub. No.: WO2017/002292
PCT Pub. Date: Jan. 5, 2017

(65) Prior Publication Data
US 2018/0115024 A1    Apr. 26, 2018

(30) Foreign Application Priority Data

Jun. 30, 2015  (JP) ................. 2015-131412

(51) Int. Cl.
*H02J 7/00* (2006.01)
*H01M 10/44* (2006.01)
(Continued)

(52) U.S. Cl.
CPC ........... *H01M 10/44* (2013.01); *H01M 4/525* (2013.01); *H01M 4/58* (2013.01); *H01M 4/5825* (2013.01);
(Continued)

(58) Field of Classification Search
CPC .................................................. H02J 7/0068
(Continued)

(56) References Cited

U.S. PATENT DOCUMENTS 5,548,201 A * 8/1996 Grabon ................. H02J 7/0091
320/150
5,936,317 A * 8/1999 Sasanouchi ........... H02J 7/0031
307/10.1
(Continued)

FOREIGN PATENT DOCUMENTS

JP    2001-309568 A    11/2001
JP    2004-222427 A     8/2004
(Continued)

OTHER PUBLICATIONS

International Search Report (with English translation) dated Jul. 12, 2016 in corresponding international application No. PCT/JP2016/002298 (4 pages).

(Continued)

*Primary Examiner* — Yalkew Fantu
(74) *Attorney, Agent, or Firm* — K&L Gates LLP

(57) ABSTRACT

Provided is an electrical storage system including an electrical storage unit that includes one or two or more storage batteries, a storage unit that stores historical information of the electrical storage unit, and a control unit. The control unit acquires the historical information from the storage unit, and performs a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value.

13 Claims, 10 Drawing Sheets

(51) Int. Cl.

| | | |
|---|---|---|
| *H01M 4/525* | (2010.01) | |
| *H01M 4/58* | (2010.01) | |
| *H01M 10/48* | (2006.01) | |
| *H02J 3/38* | (2006.01) | |
| *H02J 7/02* | (2016.01) | |
| *H02J 7/35* | (2006.01) | |
| *H02J 7/34* | (2006.01) | |
| *H02J 3/32* | (2006.01) | |
| *H01M 4/583* | (2010.01) | |

(52) U.S. Cl.
CPC ......... *H01M 10/48* (2013.01); *H01M 10/486* (2013.01); *H02J 3/38* (2013.01); *H02J 7/00* (2013.01); *H02J 7/007* (2013.01); *H02J 7/0019* (2013.01); *H02J 7/0029* (2013.01); *H02J 7/0073* (2013.01); *H02J 7/02* (2013.01); *H02J 7/34* (2013.01); *H02J 7/35* (2013.01); *H01M 4/583* (2013.01); *H02J 3/32* (2013.01); *H02J 2007/0037* (2013.01)

(58) Field of Classification Search
USPC ........................................................ 320/137
See application file for complete search history.

(56) References Cited

U.S. PATENT DOCUMENTS

| | | | | |
|---|---|---|---|---|
| 8,384,353 | B2* | 2/2013 | Miyazaki | ............ H01M 10/441 320/120 |
| 2002/0060554 | A1 | 5/2002 | Odaohhara et al. | |
| 2008/0224667 | A1 | 9/2008 | Tanaka et al. | |
| 2009/0072791 | A1* | 3/2009 | Morita | .................. H02J 7/0018 320/134 |
| 2014/0107956 | A1 | 4/2014 | Miyaki | |
| 2014/0225622 | A1* | 8/2014 | Kudo | .................... B60L 3/0046 324/433 |
| 2015/0372514 | A1* | 12/2015 | Kobayashi | .......... H01M 10/482 320/134 |
| 2017/0207637 | A1* | 7/2017 | Sugeno | ............... B60L 11/1851 |

FOREIGN PATENT DOCUMENTS

| | | |
|---|---|---|
| JP | 2005-192383 A | 7/2005 |
| JP | 2008-228492 A | 9/2008 |
| JP | 2008-236991 A | 10/2008 |
| JP | 2008-295171 A | 12/2008 |
| JP | 2011-109840 A | 6/2011 |
| JP | 2012-227986 A | 11/2012 |
| JP | 2014-081238 | 5/2014 |
| JP | 2014-190763 | 10/2014 |

OTHER PUBLICATIONS

Written Opinion dated Jan. 26, 2016 in corresponding international application No. PCT/JP2016/002298 (5 pages).
Japanese Office Action dated Dec. 18, 2018 in corresponding Japanese Application No. 2017-526154.
European Office Action dated Jan. 7, 2019 in corresponding European Application NO. 16817406.8.

* cited by examiner

ELECTRICAL STORAGE SYSTEM, CONTROLLER, AND STORAGE BATTERY CHARGING AND DISCHARGING METHOD

CROSS-REFERENCE TO RELATED APPLICATIONS

The present application claims the benefit of International Application No. PCT/JP2016/002298, filed May 10, 2016, which claims priority to Japanese Application No. 2015-131412, filed Jun. 30, 2015, the disclosures of which are incorporated herein by reference.

BACKGROUND

The present technology relates to an electrical storage system, a controller, and a storage battery charging and discharging method.

Recently, a use of a storage battery such as a lithium ion battery has been rapidly expanding to an electrical storage module for electric power storage which is combined with a new energy system such as a solar battery and wind power generation, a storage battery for vehicles, and the like. Patent Document 1 discloses an electrically driven vehicle including the storage battery (refer to Patent Document 1).

CITATION LIST

Patent Document

Patent Document 1: Japanese Patent Application Laid-Open No. 2014-81238

SUMMARY

Under circumstances such as a case where the storage battery is left in a high-temperature environment, a case where the storage battery is charged and discharged in the high-temperature environment, a case where the storage battery is charged in a low-temperature environment, and a case where the storage battery is subjected to float charging, there is a problem that capacity deterioration is promoted.

Accordingly, an object of the present technology is to provide an electrical storage system, a control device, and a storage battery charging and discharging method which are capable of suppressing capacity deterioration in a storage battery.

The present technology is an electrical storage system, including: an electrical storage unit that includes one or two or more storage batteries; a storage unit that stores historical information of the electrical storage unit; and a control unit that acquires the historical information from the storage unit, and performs a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value, in which the voltage changing condition is at least one of a condition in which the number of charging and discharging cycles, which are performed with the typical-charging voltage value, in the electrical storage unit is greater than a predetermined number of cycles, a condition in which out-of-temperature-range accumulated time, for which the electrical storage unit is used out of a typical-use temperature range, is greater than a threshold value, a condition in which internal resistance is greater than a predetermined value, a condition in which full-charging capacity is reduced from initial capacity by a predetermined value, and a condition of exceeding over passed accumulated time that is predicted by lifespan prediction.

The present technology is a controller, including: a control unit that acquires the historical information of an electrical storage unit including one or two or more storage batteries, and performs a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value, in which the voltage changing condition is at least one of a condition in which the number of charging and discharging cycles, which are performed with the typical-charging voltage value, in the electrical storage unit is greater than a predetermined number of cycles, a condition in which out-of-temperature-range accumulated time, for which the electrical storage unit is used out of a typical-use temperature range, is greater than a threshold value, a condition in which internal resistance is greater than a predetermined value, a condition in which full-charging capacity is reduced from initial capacity by a predetermined value, and a condition of exceeding over passed accumulated time that is predicted by lifespan prediction.

The present technology is a storage battery charging and discharging method, including: acquiring the historical information of an electrical storage unit including one or two or more storage batteries; and performing a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value, in which the voltage changing condition is at least one of a condition in which the number of charging and discharging cycles, which are performed with the typical-charging voltage value, in the electrical storage unit is greater than a predetermined number of cycles, a condition in which out-of-temperature-range accumulated time, for which the electrical storage unit is used out of a typical-use temperature range, is greater than a threshold value, a condition in which internal resistance is greater than a predetermined value, a condition in which full-charging capacity is reduced from initial capacity by a predetermined value, and a condition of exceeding over passed accumulated time that is predicted by lifespan prediction.

According to the present technology exhibits an effect capable of suppressing the capacity deterioration in the storage battery.

DETAILED DESCRIPTION

Hereinafter, embodiments of the present technology will be described with reference to the accompanying drawings. Description will be made in the following order.

1. First Embodiment (Example of Electrical Storage System)
2. Second Embodiment (Example of Deterioration Prediction)
3. Application Example
4. Modification Example Furthermore, the following embodiments and the like are appropriate specific examples of the present technology, and the contents of the present technology are not limited to the embodiments. In addition, effects described in this specification are illustrative only, and there is no limitation thereto. In addition, it should be understood that existence of effects different from the exemplified effects is possible.

1. First Embodiment (Configuration of Electrical Storage System)

Figure 1:
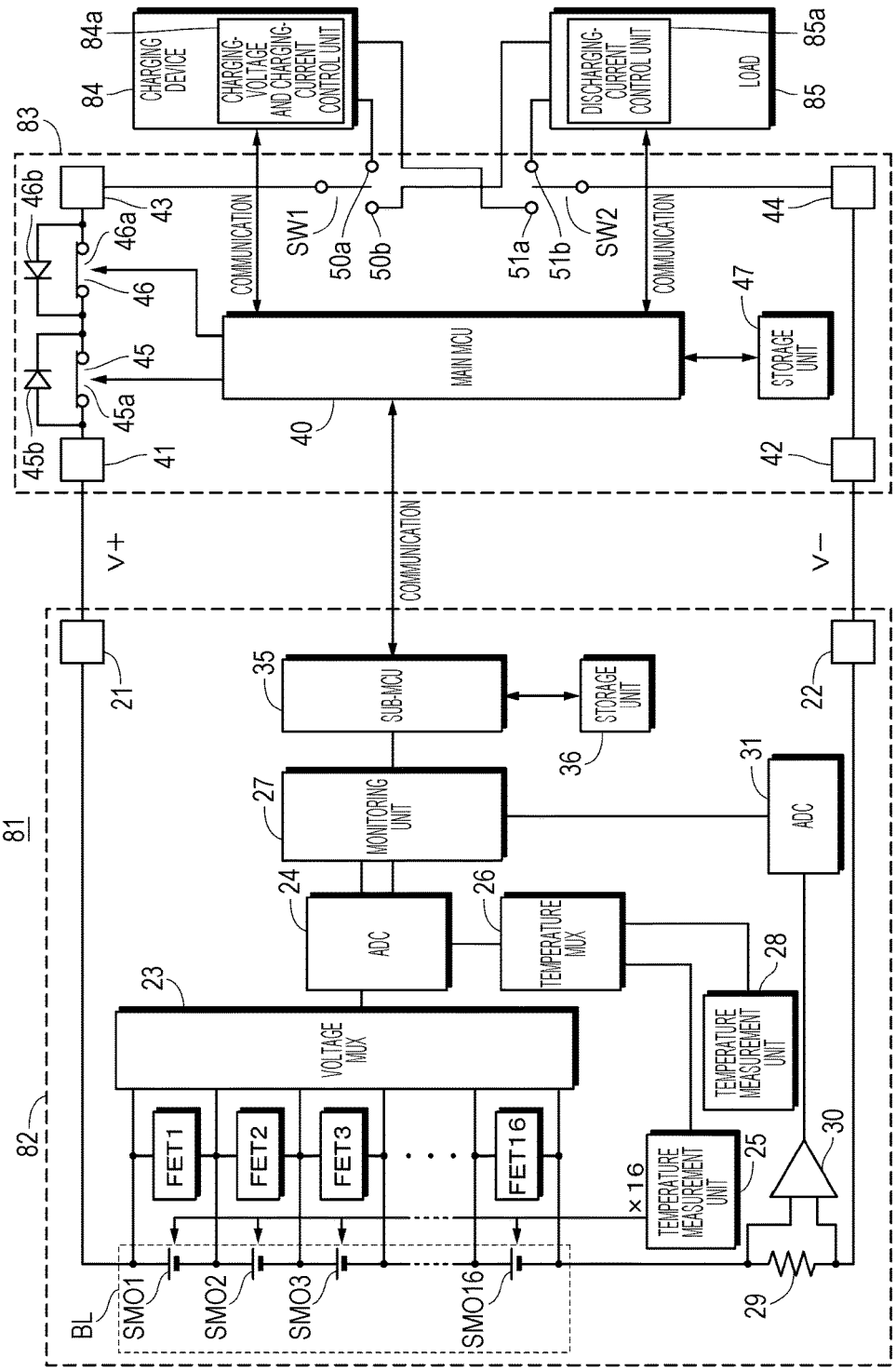
FIG. 1 is a block diagram illustrating an example of a configuration of an electrical storage system.

Description will be given of an electrical storage system according to the first embodiment of the present technology. FIG. 1 illustrates an example of a configuration of the electrical storage system. An electrical storage system 81 includes an electrical storage module 82 and a controller 83. Electric power transmission and a communication are made between the electrical storage module 82 and the controller 83. In FIG. 1, only one electrical storage module is illustrated. However, a plurality of the electrical storage modules may be connected to each other, and each of the electrical storage modules may be connected to a controller.

The controller 83 is connected to a charging device (charging power supply) 84 or a load 85 through an electric power cable and a communication bus. When charging the electrical storage module 82, the controller 83 is connected to the charging device 84. The charging device 84 includes a direct current (DC)-direct current (DC) converter, and the like, and includes at least a charging-voltage and charging-current control unit 84a. For example, the charging-voltage and charging-current control unit 84a sets a charging voltage and a charging current to predetermined values in correspondence with a control of the controller 83 (a main micro control unit 40).

When discharging the electrical storage module 82, the controller 83 is connected to the load 85. Electric power of the electrical storage module 82 is supplied to the load 85 through the controller 83. The load 85, which is connected to the controller 83, is an inverter circuit of a motor system in an electric vehicle, an electric power system for a house, and the like.

The load 85 includes at least a discharging-current control unit 85a. For example, the discharging-current control unit 85a sets a discharging current to a predetermined value in correspondence with a control of the main micro control unit 40 of the controller 83. For example, the load 85 allows load resistance to be variable so as to appropriately control the magnitude of the discharging current (load current) that flows to the electrical storage module 82.

(Configuration of Electrical Storage Module)

Description will be given of an example of a configuration of the electrical storage module 82. For example, respective units, which constitute respective units of the electrical storage module 82, are accommodated in an exterior casing having a predetermined shape. As the exterior casing, it is preferable to use a material having a high conduction rate and a high radiation rate. When using the material having the high conduction rate and the high radiation rate, it is possible to obtain excellent heat dissipation properties in the exterior casing. When the excellent heat dissipation properties are obtained, it is possible to suppress temperature rising inside the exterior casing. In addition, it is possible to minimize or eliminate an opening of the exterior casing, and thus a high dust-proof and drip-proof performance can be realized. As the exterior casing, for example, materials such as aluminum, an aluminum alloy, copper, and a copper alloy are used.

For example, the electrical storage module 82 includes a positive electrode terminal 21, a negative electrode terminal 22, an electrical storage block BL that is an electrical storage unit, a field effect transistor (FET), a voltage multiplexer 23, an analog to digital converter (ADC) 24, a temperature measurement unit 25, a temperature multiplexer 26, a monitoring unit 27, a temperature measurement unit 28, a current detection resistor 29, a current detection amplifier 30, an ADC 31, a sub-micro control unit 35, and a storage unit 36. A configuration, which is different from the exemplified configuration, may be added to the electrical storage module 82. For example, a regulator, which generates a voltage for operating respective units of the electrical storage module 82 from a voltage of the electrical storage block BL, may be added.

The electrical storage block BL is constituted by one sub-module SMO or a plurality of the sub-modules SMO which are connected to each other. As an example, sixteen sub-modules SMO including a sub-module SMO 1, a sub-module SMO 2, a sub-module SMO 3, a sub-module SMO 4, . . . , and a sub-module SMO 16 are connected in series to construct the electrical storage block BL. Furthermore, in a case where it is not necessary to discriminate individual sub-modules, the individual sub-modules are appropriately referred to as "sub-module SMO".

The sub-module SMO is formed by connecting a plurality of storage batteries (cells) to each other. For example, the sub-module SMO has a configuration including an assembled battery in which eight cells are connected to each other in parallel. For example, in a case of using a lithium ion secondary battery to be described later as the cells, the capacity of the sub-module SMO becomes, for example, approximately 24 Ah, and a voltage thereof becomes, for example, approximately 3.0 V that is approximately the same as a voltage of the cells.

The electrical storage block BL is formed by connecting a plurality of the sub-modules SMO to each other. For example, the electrical storage block BL has a configuration in which sixteen sub-modules SMO are connected to each other in series. In this case, the capacity becomes approximately 24 Ah, and the voltage becomes approximately 48 V (3.0 V×16). Furthermore, the number of the cells which constitute the sub-module SMO and a connection aspect of the cells may be appropriately changed. In addition, the number of the sub-modules SMO which constitute the electrical storage block BL and a connection aspect of the sub-modules SMO may be appropriately changed. Furthermore, discharging and charging may be performed in a unit of the electrical storage block BL, or discharging and charging may be performed in a unit of the sub-module unit or the cell.

A positive electrode side of the sub-module SMO 1 is connected to the positive electrode terminal 21 of the electrical storage module 82. A negative electrode side of the sub-module SMO 16 is connected to the negative electrode terminal 22 of the electrical storage module 82. The positive electrode terminal 21 is connected to a positive electrode terminal of the controller 83. The negative electrode terminal 22 is connected to a negative electrode terminal of the controller 83.

Sixteen FETs (an FET 1, an FET 2, an FET 3, an FET 4, ..., and an FET 16) are respectively provided between terminals of the sub-modules SMO in correspondence with the configuration of sixteen sub-modules SMO. For example, each of the FETs is configured to perform a passive type cell balance control.

Description will be given of an overview of the cell balance control that is performed by the FETs. For example, it is assumed that deterioration of the sub-module SMO 2 further progresses in comparison to the other sub-modules SMO, and internal impedance of the sub-module SMO 2 increases. When performing charging with respect to the electrical storage module 82 in this state, the sub-module SMO 2 is not charged to a normal voltage due to an increase in the internal impedance. Therefore, a variation occurs in the voltage balance between the sub-modules SMO.

So as to solve the voltage balance variation between the sub-modules SMO, the FETs other than the FET 2 are turned on, and the sub-modules SMO other than the sub-module SMO 2 are discharged to a predetermined voltage value. After the discharging, the FETs are turned off. After the discharging, for example, the voltage of each of the sub-modules SMO becomes a predetermined value, (for example, 3.0 V, and the balance between the sub-modules SMO is obtained. Furthermore, as the cell balance control type, a so-called active type or other known types are applicable without limitation to the passive type.

A voltage between terminals of each of the sub-modules SMO is detected by a voltage detection unit (not illustrated). For example, the voltage between the terminals of the sub-module SMO is detected regardless of in charging and in discharging. In discharging of the electrical storage module 82, the voltage of the sub-module SMO is detected by the voltage detection unit, for example, in a period of 250 milliseconds (ms).

The voltage (analog voltage data) of the sub-module SMO that is detected by the voltage detection unit is supplied to the voltage multiplexer (MUX) 23. In this example, since the electrical storage block is constituted by the sixteen sub-modules SMO, and thus sixteen pieces of analog voltage data are supplied to the voltage multiplexer 23.

For example, the voltage multiplexer 23 switches a channel in a predetermined period, and selects one piece of the analog voltage data among the sixteen pieces of analog voltage data. The one analog voltage data selected by the voltage multiplexer 23 is supplied to the ADC 24. Then, the voltage multiplexer 23 switches a channel, and supplies the subsequent analog voltage data to the ADC 24. That is, the sixteen pieces of analog voltage data are supplied from the voltage multiplexer 23 to the ADC 24 in a predetermined period.

Furthermore, the channel switching in the voltage multiplexer 23 is performed in correspondence with a control by the sub-micro control unit 35 of the electrical storage module 82 or the main micro control unit 40 of the controller 83.

The temperature measurement unit 25 detects a temperature of each of the sub-modules SMO. The temperature measurement unit 25 is constituted by an element such as a thermistor that detects a temperature. For example, the temperature of the sub-module SMO is detected in a predetermined period regardless of in charging or in discharging. The temperature of the sub-module SMO and a temperature of the cells which constitute the sub-module SMO are not greatly different from each other. Accordingly, in an embodiment, the temperature of the sub-module SMO is measured. Temperatures of eight individual cells may be measured, or an average value of temperatures of the eight cells may be set as the temperature of the sub-module SMO.

Analog temperature data, which is detected by the temperature measurement unit 25 and indicates the temperature of the sub-module SMO, is supplied to the temperature multiplexer (MUX) 26. In this example, since the electrical storage block BL is constituted by the sixteen sub-modules SMO, sixteen pieces of analog temperature data are supplied to the temperature multiplexer 26.

For example, the temperature multiplexer 26 switches a channel in a predetermined period, and selects one piece of the analog temperature data among the sixteen pieces of analog temperature data. The one analog temperature data selected by the temperature multiplexer 26 is supplied to the ADC 24. Then, the temperature multiplexer 26 switches a channel, and supplies the subsequent analog temperature data to the ADC 24. That is, the sixteen pieces of analog temperature data are supplied from the temperature multiplexer 26 to the ADC 24 in a predetermined period.

Furthermore, the channel switching in the temperature multiplexer 26 is performed in correspondence with a control by the sub-micro control unit 35 of the electrical storage module 82 or the main micro control unit 40 of the controller 83.

The ADC 24 converts the analog voltage data, which is supplied from the voltage multiplexer 23, into digital voltage data. For example, the ADC 24 converts the analog voltage data into digital voltage data of 14 to 18 bits. Various types such as a successive comparison type and a ΔΣ (delta sigma) type are applicable to the conversion type in the ADC 24.

For example, the ADC 24 includes an input terminal, an output terminal, a control signal input terminal to which a control signal is input, and a clock pulse input terminal to which a clock pulse is input (furthermore, the terminals are not illustrated). Analog voltage data is input to the input terminal. Digital voltage data after conversion is output from the output terminal.

For example, a control signal (control command), which is supplied from the controller 83, is input to the control signal input terminal. For example, the control signal is an acquisition instruction signal that instructs acquisition of the analog voltage data that is supplied from the voltage multiplexer 23. When the acquisition instruction signal is input, analog voltage data is acquired by the ADC 24, and the analog voltage data, which is acquired, is converted into digital voltage data. In addition, the digital voltage data is output through the output terminal in correspondence with a synchronous clock pulse that is input to the clock pulse input terminal. The digital voltage data, which is output, is supplied to the monitoring unit 27.

In addition, an acquisition instruction signal, which instructs acquisition of the analog temperature data supplied from the temperature multiplexer 26, is input to the control signal input terminal. The ADC 24 acquires analog temperature data in correspondence with the acquisition instruction signal. The analog temperature data, which is acquired, is converted into digital temperature data by the ADC 24. For example, the analog temperature data is converted into digital temperature data of 14 to 18 bits. The digital temperature data, which is converted, is output through the output terminal, and the digital temperature data, which is output, is supplied to the monitoring unit 27. Furthermore, an ADC, which processes each of the voltage data and the temperature data, may be separately provided. A functional block of the ADC 24 may also have a function of a comparator that compares the voltage or the temperature with a predetermined value.

For example, sixteen pieces of digital voltage data or sixteen pieces of digital temperature data are transmitted from the ADC 24 to the monitoring unit 27 in a time-division multiplexed manner. An identifier, which identifies the sub-module SMO, may be described in a header of transmission data to indicate that the voltage or the temperature is a voltage or a temperature of which sub-module SMO. Furthermore, in this example, the digital voltage data of the sub-module SMO, which is obtained in a predetermined period and is converted into digital data by the ADC 24, corresponds to voltage information. The analog voltage data may be the voltage information, or digital voltage data, which is subjected to correction processing, may be the voltage information.

The temperature measurement unit 28 measures a temperature of the entirety of the electrical storage module 82. A temperature inside the exterior casing of the electrical storage module 82 is measured by the temperature measurement unit 28. Analog temperature data, which is measured by the temperature measurement unit 28, is supplied to the temperature multiplexer 26, and is supplied from the temperature multiplexer 26 to the ADC 24. In addition, the analog temperature data is converted into digital temperature data by the ADC 24. The digital temperature data is supplied from the ADC 24 to the monitoring unit 27.

The electrical storage module 82 includes a current detection unit that detects a value of a current (load current) that flows through a current path of the electrical storage module 82. The current detection unit detects a value of a current that flows through each of the sixteen sub-modules SMO.

For example, the current detection unit includes the current detection resistor 29 that is connected between a negative electrode side of the sub-module SMO 16 and the negative electrode terminal 22, and the current detection amplifier 30 that is connected to both ends of the current detection resistor 29. Analog current data is detected by the current detection resistor 29. For example, the analog current data is detected in a predetermined period regardless of in charging and in discharging.

The analog current data, which is detected, is supplied to the current detection amplifier 30. The analog current data is amplified by the current detection amplifier 30. For example, a gain of the current detection amplifier 30 is set to approximately 50 to 100 times. The analog current data, which is amplified, is supplied to the ADC 31.

The ADC 31 converts the analog current data, which is supplied from the current detection amplifier 30, into digital current data. For example, the analog current data is converted into digital current data of 14 to 18 bits by the ADC 31. Various types such as a successive comparison type and a $\Delta\Sigma$ (delta sigma) type are applicable to the conversion type in the ADC 31.

For example, the ADC 31 includes an input terminal, an output terminal, a control signal input terminal to which a control signal is input, and a clock pulse input terminal to which a clock pulse is input (furthermore, the terminals are not illustrated). Analog current data is input to the input terminal. Digital current data is output from the output terminal.

For example, a control signal (control command), which is supplied from the controller 83, is input to the control signal input terminal of the ADC 31. For example, the control signal is an acquisition instruction signal that instructs acquisition of the analog current data that is supplied from the current detection amplifier 30. When the acquisition instruction signal is input, analog current data is acquired by the ADC 31, and the analog current data, which is acquired, is converted into digital current data. In addition, the digital current data is output from the output terminal in correspondence with a synchronous clock pulse that is input to the clock pulse input terminal. The digital current data, which is output, is supplied to the monitoring unit 27. The digital current data is an example of current information. Furthermore, the ADC 24 and the ADC 31 may be constituted as the same ADC.

The monitoring unit 27 monitors the digital voltage data and the digital temperature data which are supplied from the ADC 24, and monitors whether or not the sub-module SMO is abnormal. For example, in a case where a voltage, which is indicated by the digital voltage data, is close to a voltage that becomes the reference of over-charging or a voltage that becomes the reference of over-discharging, the monitoring unit 27 generates an abnormality notification signal that indicates that abnormality may occur. In addition, even in a case where the temperature of the sub-module SMO or the temperature of the entirety of the electrical storage module 82 is higher than a threshold value, the monitoring unit 27 generates an abnormality notification signal in a similar manner.

In addition, the monitoring unit 27 monitors the digital current data that is supplied from the ADC 31. In a case where a current value, which is indicated by the digital current data, is greater than a threshold value, the monitoring unit 27 generates an abnormality notification signal. The abnormality notification signal, which is generated by the monitoring unit 27, is transmitted to the sub-micro control unit 35 by a communication function of the monitoring unit 27.

The monitoring unit 27 monitors whether or not abnormality occurs, and transmits the digital voltage data for every sixteen sub-modules SMO supplied from the ADC 24 and the digital current data supplied from the ADC 31 to the sub-micro control unit 35. The digital voltage data and the digital current data for each sub-module SMO may be directly supplied to the sub-micro control unit 35 without through the monitoring unit 27. The digital voltage data and the digital current data, which are transmitted, for each sub-module SMO are input to the sub-micro control unit 35. In addition, the digital temperature data, which is supplied from the ADC 24, is supplied from the monitoring unit 27 to the sub-micro control unit 35.

The sub-micro control unit 35 is constituted by a central processing unit (CPU) having a communication function, and the like, and controls respective units of the electrical storage module 82. For example, when the abnormality notification signal is supplied from the monitoring unit 27, the sub-micro control unit 35 notifies the main micro control unit 40 of the controller 83 of the abnormality by using the communication function. The main micro control unit 40 appropriately executes processing such as processing of stopping charging or discharging in correspondence with the notification. Furthermore, the notation of "sub" or "main" in the sub-micro control unit and the main micro control unit is described for convenience of explanation, and does not have specific meaning.

A bidirectional communication conforming to standards such as I2C, system management bus (SM bus), a serial peripheral interface (SPI), and CAN, which are serial communication standards, is performed between the sub-micro control unit 35 and the main micro control unit 40. The communication may be a wired communication or a wireless communication.

The digital voltage data is input from the monitoring unit 27 to the sub-micro control unit 35. For example, in discharging of the electrical storage module 82, the digital voltage data for each sub-module SMO is input to the sub-micro control unit 35.

In addition, the magnitude of a load current (digital current data) when a load is connected to the electrical storage module 82 is input from the monitoring unit 27 to the sub-micro control unit 35. A digital temperature data, which indicates the temperature for each sub-module SMO or the temperature inside the electrical storage module 82, is input to the sub-micro control unit 35.

The sub-micro control unit 35 transmits the input digital voltage data for each sub-module SMO and the input digital temperature data indicating a temperature for each sub-module SMO, the digital current data, and the like to the main micro control unit 40.

The storage unit 36 is constituted by a read only memory (ROM), a random access memory (RAM), or the like. For example, a program, which is executed by the sub-micro control unit 35, is stored in the storage unit 36. In addition, the storage unit 36 is used as a work area when the sub-micro control unit 35 executes processing.

Historical information related to the electrical storage module 82 is stored in the storage unit 36. For example, the historical information includes charging conditions such as a charging rate, charging time, the number of times of charging, discharging conditions such as a discharging rate, discharging time, and the number of times of discharging, temperature information, and the like. The pieces of information may be recorded in unit of each of the electrical storage block BL, the sub-module SMO, and the storage battery. The sub-micro control unit 35 may perform processing with reference to the historical information.

(Configuration of Controller)

Description will be given of an example of a configuration of the controller 83. The controller 83 performs a charging managing or a discharging managing with respect to one or a plurality of the electrical storage modules 82. Specifically, the controller 83 performs initiation and stopping of charging of the electrical storage module 82, initiation and stopping of discharging of the electrical storage module 82, setting of a charging rate and a discharging rate, and the like. For example, the controller 83 has a configuration provided with an exterior casing similarly to the electrical storage module 82.

The controller 83 includes the main micro control unit 40, a positive electrode terminal 41, a negative electrode terminal 42, a positive electrode terminal 43, a negative electrode terminal 44, a charging control unit 45, a discharging control unit 46, a switch SW1, and a switch SW2. The switch SW1 is connected to a terminal 50a or a terminal 50b. The switch SW2 is connected to a terminal 51a or a terminal 51b.

The positive electrode terminal 31 is connected to the positive electrode terminal 21 of the electrical storage module 82. The negative electrode terminal 32 is connected to the negative electrode terminal 22 of the electrical storage module 82. The positive electrode terminal 33 and the negative electrode terminal 34 are connected to the charging device 84 or the load 85 which is connected to the controller 83.

For example, the main micro control unit 40 is constituted by a CPU having a communication function, and controls respective units of the controller 83. The main micro control unit 40 controls charging and discharging in correspondence with the abnormality notification signal that is transmitted from the sub-micro control unit 35 of the electrical storage module 82. For example, in a case where the main micro control unit 40 is notified of an abnormality notification signal indicating an over-charging concern, the main micro control unit 40 turns off at least a switching element of the charging control unit 45 to stop charging. For example, in a case where the main micro control unit 40 is notified of an abnormality notification signal indicating an over-discharging concern, the main micro control unit 40 turns off at least a switching element of the discharging control unit 46 to stop discharging.

For example, in a case where the main micro control unit 40 is notified of an alarm signal indicating deterioration in the sub-module SMO, the main micro control unit 40 turns off switching elements of the charging control unit 45 and the discharging control unit 46 to stop use of the electrical storage module 82. For example, in a case where the electrical storage module 82 is used as a back-up power supply, the main micro control unit 40 does not immediately stops use of the electrical storage module 82 and stops use of the electrical storage module 82 at appropriately timing.

In addition to the charging management and the discharging management of the electrical storage module 82, the main micro control unit 40 performs a control to execute a charging and discharging method to be described later with reference to the historical information such as the voltage and the temperature of the sub-module SMO which is transmitted from the sub-micro control unit 35, and the number of cycles. Furthermore, the sub-micro control unit 35 may have a part of the function of the main micro control unit 40 to be described below.

The main micro control unit 40 can perform a communication with a CPU of the charging device 84 or the load 85, and the like. The main micro control unit 40 sets a charging voltage and a charging rate (magnitude of a charging current) to the electrical storage module 82, and transmits the charging voltage and the charging rate, which are set, to the charging device 84. The charging-voltage and charging-current control unit 84a appropriately sets the charging voltage and the charging current in accordance with the charging voltage and the charging rate which are transmitted from the main micro control unit 40.

The main micro control unit 40 sets a discharging rate (the magnitude of a discharging current) in discharging of the electrical storage module 82, and transmits the discharging rate, which is set, to the load 85. The discharging-current control unit 85a of the load 85 appropriately sets a load to attain a discharging current corresponding to the discharging rate that is transmitted from the main micro control unit 40.

The charging control unit 45 includes a charging control switch 45a and a diode 45b that is connected in parallel with the charging control switch 45a and in a forward direction with respect to a discharging current. The discharging control unit 46 includes a discharging control switch 46a and a diode 46b that is connected in parallel with the discharging control switch 46a and in a forward direction with respect to a charging current. As the charging control switch 45a and the discharging control switch 46a, for example, an insulated gate bipolar transistor (IGBT) or a metal oxide semiconductor field effect transistor (MOSFET) can be used. Furthermore, the charging control unit 45 and the discharging control unit 46 may be inserted to a negative power supply line.

A storage unit 47 includes a ROM, a RAM, or the like. For example, a program that is executed by the main micro control unit 40 is stored in the storage unit 47. The storage unit 47 is used as a work area when the main micro control unit 40 executes processing. The above-described historical information may be stored in the storage unit 47.

The switch SW1 is connected to a positive power supply line that is connected to the positive electrode terminal 43. In charging of the electrical storage module 82, the switch SW1 is connected to a terminal 50a, and in discharging of the electrical storage module 82, the switch SW1 is connected to a terminal 50b.

The switch SW2 is connected to a negative power supply line that is connected to the negative electrode terminal 44. In charging of the electrical storage module 82, the switch SW2 is connected to a terminal 51a, and in discharging of the electrical storage module 82, the switch SW2 is connected to a terminal 51b. Switching of the switch SW1 and the switch SW2 is controlled by the main micro control unit 40.

(With Regard to Example of Storage Battery)

Description will be given of a storage battery that is used in the electrical storage system according to the present technology. An example of the storage battery according to the present technology is a lithium ion secondary battery. Furthermore, the storage battery is not limited to the lithium ion secondary battery, and various secondary batteries such as a lead storage battery and a nickel-hydrogen (NiMH) storage battery can be used.

In the lithium ion secondary battery, a material capable of intercalating and deintercalating lithium can be used as a positive electrode active material, and a material capable of intercalating and deintercalating lithium can be used as a negative electrode active material.

Examples of the positive electrode active material include a composite oxide (referred to as "lithium-transition metal composite oxide") that contains lithium and a transition metal element, a phosphate compound (referred to as lithium-transition metal phosphate compound) that contains lithium and a transition metal element, and the like.

Examples of the lithium-transition metal composite oxide include a lithium-transition metal composite oxide having a layered rock salt structure, a lithium-transition metal composite oxide having a spinel structure, and the like.

Examples of the lithium-transition metal composite oxide having the layered rock salt structure include a lithium-containing compound expressed by a general formula $LixM1O_2$ (in the formula, M1 represents elements including one or more kinds of transition metal elements. A value of x is different depending on a battery charging and discharging state and satisfies a relationship of $0.05 \leq x \leq 1.10$ as an example), and the like. Specific examples of the lithium-transition metal composite oxide include a lithium-cobalt composite oxide ($Li_xCoO_2$), a lithium-nickel composite oxide ($Li_xNiO_2$), a lithium-nickel-cobalt composite oxide ($Li_xNi_{1-z}Co_zO_2$ ($0<z<1$)), a lithium-nickel-cobalt-manganese composite oxide ($Li_xNi_{(1-v-w)}Co_vMn_wO_2$ ($0<v+w<1$, $v>0$, $w>0$)), a lithium-cobalt-aluminum-magnesium composite oxide ($Li_xCo_{(1-p-q)}Al_pMg_qO_2$ ($0<p+q<1$, $p>0$, $q>0$)), and the like.

Examples of the lithium-transition metal composite oxide having a spinel structure include a lithium-manganese composite oxide ($LiMn_2O_4$), a lithium-manganese-nickel composite oxide ($Li_xMn_{2-t}Ni_tO_4$ ($0<t<2$)), and the like.

Examples of the lithium-transition metal phosphate compound include a lithium-transition metal phosphate compound having an olivine type structure, and the like.

Examples of the lithium-transition metal phosphate compound having an olivine type structure include a lithium-containing compound expressed by a chemical formula $Li_yM2PO_4$ (in the formula, M2 represents elements including one or more kinds of transition metal elements. A value of y is different depending on a battery charging and discharging state and satisfies a relationship of $0.05 \leq y \leq 1.10$ as an example), and the like. Specific examples of the lithium-transition metal phosphate compound include lithium-iron phosphate compound ($Li_yFePO_4$), a lithium-iron-manganese phosphate compound ($Li_yFe_{1-u}Mn_uPO_4$ ($0<u<1$)), and the like.

Furthermore, the positive electrode active material is not limited to the above-described materials, and a known material can be widely used.

As the negative electrode active material, a carbon material such as graphite, a silicon (Si)-containing material, a tin (Sn)-containing material, lithium titanate, and the like can be used. Furthermore, the negative electrode active material is not limited to the above-described materials, and a known material can be widely used.

A configuration of the electrodes of the lithium ion secondary battery and a method of manufacturing the electrodes according to the present technology are not particularly limited, and a known configuration and a known method can be widely used.

A configuration of the lithium ion secondary battery according to the present technology is not particularly limited, and a known configuration can be widely used.

An electrolytic solution of the lithium ion secondary battery according to the present technology is not particularly limited, and an electrolytic solution that is used in the industry can be widely used. Furthermore, a gel-like electrolyte or a solid electrolyte can be used instead of the electrolytic solution.

Examples of electrolytic solution solvents include a lactone-based solvent such as γ-butyrolactone, γ-valerolactone, δ-valerolactone, and ε-caprolactone, a carbonic acid ester-based solvent such as ethylene carbonate, propylene carbonate, butylene carbonate, vinylene carbonate, dimethyl carbonate, ethyl methyl carbonate, and diethyl carbonate, an ether-based solvent such as 1,2-dimethoxyethane, 1-ethoxy-2-methoxyethane, 1,2-diethoxyethane, tetrahydrofuran, and 2-methyltetrahydrofuran, a nitrile-based solvent such as acetonitrile, a sulfolane-based solvent, phosphoric acids, a phosphoric acid ester solvent, nonaqueous solvent such as pyrrolidone, and the like. The solvents may be used alone, or two or more kinds thereof may be mixed and used.

In addition, with regard to the nonaqueous solvent, it is preferable to use a mixture of cyclic carbonic acid ester and chain carbonic acid ester, and it is more preferable to include a compound in which apart or the entirety of hydrogen in the cyclic carbonic acid ester or the chain carbonic acid ester is fluorinated. As the fluorinated compound, it is preferable to use fluoroethylene carbonate (4-fluoro-1,3-dioxolan-2-one: FEC) and difluoroethylene carbonate (4,5-difluoro-1,3-dioxolane-2-one: DFEC)

As an electrolyte salt, for example, lithium salts such as lithium hexafluorophosphate ($LiPF_6$), bis(pentafluoroethanesulfonyl)imide lithium ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), bis(trifluoromethanesulfonyl)imide lithium ($Li(CF_3SO_2)_2N$), tris(trifluoromethanesulfonyl) methyl lithium ($LiC(SO_2CF_3)_3$) can be used.

Lithium ion secondary batteries can be classified into a square type, a cylindrical type, a laminated film type, and the like in correspondence with a shape and the like. For example, an average output voltage of a typical cylindrical lithium ion secondary battery is approximately 3.0 V. For example, a full-charging voltage is approximately 4.2 V. For example, capacity is 3 Ah (3000 mAh).

(With Regard to Performance Deterioration of Storage Battery)

Under circumstances such as a case where the storage battery is charged in a low-temperature environment, a case where the storage battery is left in a high-temperature environment, a case where the storage battery is charged and discharged in the high-temperature environment, a case where the storage battery is charged in a low-temperature environment, and a case where the storage battery is subjected to float charging, performance deterioration such as capacity deterioration tends to be promoted. For example, in a lithium ion secondary battery that is an example of the storage battery, the following performance deterioration is apt to occur.

(Deterioration Due to Low-Temperature Charging)

When the lithium ion secondary battery is charged at a low temperature (for example, 0° C. or lower), a lithium ion, which is deintercalated from the positive electrode, is less likely to be intercalated to the negative electrode, and thus the lithium ion precipitates to a surface of the negative electrode. As a result, electrode resistance increases. In addition, a layer of the precipitated metal lithium is additionally deposited, and thus intercalation of the lithium ion may be obstructed. When a reaction in the electrodes is obstructed, charging and discharging efficiency decreases, and the performance (capacity, a cycle lifespan, and the like) of the lithium ion secondary battery deteriorates. Accordingly, charging at a low temperature (for example, 0° C. or lower) causes significant performance deterioration in the lithium ion secondary battery.

(Deterioration Due to High-Temperature Cycle and High-Temperature Storage)

When the lithium ion secondary battery is charged and discharged at a high temperature, or is left at a high temperature, capacity deterioration tends to be promoted.

(Deterioration Due to Float Charging)

In the float charging, a battery is retained in a fully charged state. Accordingly, the float charging corresponds to continuous constant-voltage charging with a low addition voltage (low-rate constant-voltage, float charging voltage). The float charging is employed for the purpose of compensating capacity, which is lost in discharging due to intermittent use or self-discharging, through normal charging. In a case of performing the float charging, capacity deterioration tends to be promoted.

(Overview of Charging and Discharging Method)

Description will be given of an overview of a charging and discharging method that is applied to the electrical storage system according to the first embodiment of the present technology. In the charging and discharging method according to the first embodiment of the present technology, in a case where a charging-voltage setting value changing condition is satisfied in a state in which a typical-voltage charging and discharging cycle is performed, a charging setting voltage value in the typical-voltage charging and discharging is changed to a low-charging voltage value and low-voltage charging and discharging cycle is performed in a predetermined number of times. Then, the charging setting voltage value is changed to a typical-charging voltage value, and it returns to the typical-voltage charging and discharging cycle. Accordingly, it is possible to suppress capacity deterioration without allowing a user to recognize a decrease in temporal capacity due to the voltage change.

Here, the "typical-voltage charging and discharging cycle" represents a charging and discharging cycle that is performed with a charging setting voltage value (referred to as "typical-charging voltage value") in a typical use. The "typical-charging voltage value" represents a charging setting voltage value that is set in a typical-voltage charging and discharging cycle. Specifically, for example, the typical-charging voltage value is a typical charging setting voltage value that is employed in correspondence with the kind of the storage battery. In a case of a typical lithium ion secondary battery, the typical-charging voltage value is set to, for example, 4.20 V.

The "low-voltage charging and discharging cycle" represents a charging and discharging cycle that is performed with a charging setting voltage value (referred to as "low-charging voltage value") that is lower than the typical-charging voltage value. For example, the "low-charging voltage value" represents a charging voltage value obtained by subtracting a predetermined voltage value from the typical-charging voltage value.

For example, the "predetermined voltage value" in the subtraction from the typical-charging voltage value is preferably 0.1 V to 0.3 V, and more preferably 0.1 V to 0.2 V from the viewpoint of not allowing a user to recognize a temporal capacity decrease due to a voltage change. For example, in a case of a lithium ion secondary battery in which a typical-charging setting voltage value is 4.2 V, the low-charging voltage value is more preferably 4.0 V to 4.1 V.

The predetermined number of times of performing the low-voltage charging and discharging cycle is preferably 1 to 30 times, and more preferably 1 to 5 times from the viewpoint of not allowing a user to recognize a temporal capacity reduction due to a voltage change. In addition, in the low-voltage charging and discharging cycle, when charging is completed, it is preferable to perform display such as typical capacity display (for example, 100%, and the like) indicating a fully charged state on a display unit and the like which are provided in the controller 83, the electrical storage module 82, and the like. With this configuration, the user is not caused to recognize the temporal capacity decrease due to voltage change.

Changing from a typical charging and discharging cycle to the low-voltage charging and discharging cycle is performed, for example, in a case of satisfying at least one condition between a condition of "the number of charging and discharging cycles performed with the typical-charging voltage value is greater than a predetermined number of cycles" and a condition of "out-of-temperature-range accumulated time is greater than a threshold value" as "charging-voltage setting value changing conditions". In addition, it is known that internal resistance increases when deterioration of the lithium ion secondary battery progresses. Therefore, initial internal resistance may be stored, and a condition of "a predetermined value increases from the initial internal resistance" may be added to the above-described conditions. In this state, in a case where at least one condition among the conditions is satisfied, it may be determined that deterioration is in progress and the typical charging and discharging cycle may be changed to the low-voltage charging and discharging cycle. In addition, initial full-charging capacity may be stored, and a condition of "full-charging capacity decreases from initial value (initial capacity) by a predetermined amount" may be added to the above-described conditions. In this state, in a case where at least one condition among the conditions is satisfied, it may be determined that deterioration is in progress, and the typical charging and discharging cycle may be changed to the low-voltage charging and discharging cycle.

"Predetermined number of cycles" is set in correspondence with capacity deterioration characteristics of the storage battery, and is, for example, 500 to 1000 cycles in a case of a typical lithium ion secondary battery. Furthermore, counting of the number of typical charging and discharging cycles is reset when the low-voltage charging and discharging cycle is performed, and is counted from "0" when it returns to a typical-charging setting value.

"Out-of-temperature-range accumulated time" is obtained by accumulating time for which the storage battery is used out of a temperature range (referred to as "typical-use temperature range") of a typical use condition (for example, a recommended use condition, and the like). "Use time out of the typical-use temperature range" represents time for which the storage battery is left in a temperature environment higher than the typical-use temperature range (also including charging and discharging time), and time for which the storage battery is charged in a temperature environment lower than the typical-use temperature range. For example, in a case of a typical lithium ion secondary battery, the typical-use temperature range is 0° C. to 40° C. Furthermore, the typical-use temperature range is not limited to the range. For example, a threshold value is set to 300 hours to 500 hours. A temperature condition may be added in the setting.

(Effect by Charging and Discharging Method According to Present Technology)

Figure 2:
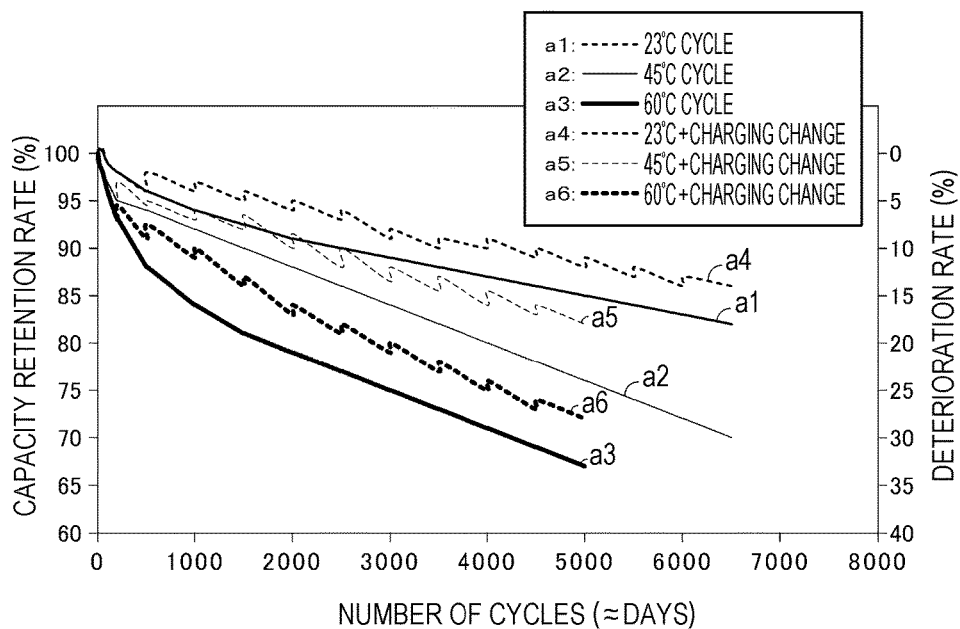
FIG. 2 is a graph illustrating a variation in a capacity retention rate of a lithium ion secondary battery.

FIG. 2 is a graph illustrating a variation in a capacity retention rate of a lithium ion secondary battery. In the graph, the following measurement results relating to the lithium ion secondary battery are plotted in coordinates in which the horizontal axis represents the number of cycles (≈days), the left vertical axis represents a capacity retention rate, and the right vertical axis represents a deterioration rate. Furthermore, the number of cycles is regarded as days.

(Lithium Ion Secondary Battery)

A coin type secondary battery was prepared by using $LiFePO_4$ as a positive electrode active material and graphite as a negative electrode active material.

(Preparation of Coil Cell)

A coin-type battery (hereinafter, referred to as "coin cell") having 2016 size (size of a diameter of 20 mm and a height of 1.6 mm) was prepared as follows.

(Preparation of Positive Electrode)

91 parts by mass of $LiFePO_4$ as a positive electrode active material, 6 parts by mass of graphite as a conductive agent, 4 parts by mass of polyvinylidene fluoride (PVdF) as a binding agent were uniformly mixed, and the resultant mixture was dispersed in N-methyl-2-pyrrolidone (NMP) to obtain positive electrode mixture slurry. The positive electrode mixture slurry, which was obtained, was uniformly applied to both surfaces of aluminum foil and was dried to form a positive electrode active material layer.

(Preparation of Negative Electrode)

90 parts by mass of graphite as a negative electrode active material, and 10 parts by mass of PVdF as a binding agent were uniformly mixed, and the resultant mixture was dispersed in NMP to obtain negative electrode mixture slurry. Then, the negative electrode mixture slurry, which was obtained, was uniformly applied to both surfaces of strip-shape copper foil and was dried to form a negative electrode active material layer.

The positive electrode and the negative electrode were punched into a circular shape having a diameter of 15 mm. Next, a polyethylene micro-porous film was prepared as a separator.

Next, lithium hexafluorophosphate ($LiPF_6$) as an electrolyte salt was dissolved in a nonaqueous solvent, which was obtained by mixing ethylene carbonate (EC) and propylene carbonate (PC) in a mass ratio of 5:5, in a concentration of 1 mol/kg to prepare a nonaqueous electrolytic solution.

Next, the positive electrode and the negative electrode, which were prepared, were laminated through the micro-porous film to obtain a laminated body, and the nonaqueous electrolytic solution was accommodated at the inside of an exterior cup and an exterior can in combination with the laminated body. Then, the laminated body was caulked through a gasket. In this manner, a target coil cell was obtained.

(Charging and Discharging Test)

With regard to a line a1 to a line a6, charging and discharging were performed with respect to the coil cell, which was prepared, under the following conditions, and a capacity retention rate with respect to the number of cycles was measured.

Line a1: Temperature condition of 23° C.
Typical charging and discharging cycle 1
Line a2: Temperature condition of 45° C.
Typical charging and discharging cycle 1
Line a3: Temperature condition of 60° C.
Typical charging and discharging cycle 1
Line a4: Temperature condition of 23° C.

Typical charging and discharging cycle 1+charging change 1
Line a5: Temperature condition of 45° C.
Typical charging and discharging cycle 1+charging change 1
Line a6: Temperature condition of 60° C.
Typical charging and discharging cycle 1+charging change 1

"Typical charging and discharging cycle 1" and "typical charging and discharging cycle 1+charging change 1" are as follows.

"Typical Charging and Discharging Cycle 1"

Charging and discharging are continuously performed.

Constant-current and constant-voltage charging and constant-current discharging are performed under conditions of a charging termination voltage of 3.6 V and a discharging termination voltage of 2.0 V.

"Typical Charging and Discharging Cycle 1+Charging Change 1"

Charging and discharging are continuously performed.

Constant-current and constant-voltage charging and constant-current discharging are performed under conditions of a charging termination voltage of 3.6 V and a discharging termination voltage of 2.0 V.

Two cycles of charging and discharging are performed under a condition in which a charging voltage is reduced by 0.1 V for every 100 charging and discharging times. That is, for every 100 charging and discharging times, the constant-current and constant-voltage charging and the constant-current discharging are performed under conditions of a charging termination voltage of 3.5 V and a discharging termination voltage of 2.0 V.

As illustrated in FIG. 2, according to the line a1 and the line a4, it can be seen that when executing the charging and discharging method according to the present technology, it is possible to suppress an increase in deterioration rate (that is, a decrease in capacity retention rate) under a use environment of 23° C. According to the line a2 and the line a5, it can be seen that when executing the charging and discharging method according to the present technology, it is possible to suppress an increase in deterioration rate (that is, a decrease in capacity retention rate) under a use environment of 45° C. According to the line a3 and the line a6, it can be seen that when executing the charging and discharging method according to the present technology, it is possible to suppress an increase in deterioration rate (that is, a decrease in capacity retention rate) under a use environment of 60° C. As described above, when executing the charging and discharging method according to the present technology, it is possible to suppress capacity deterioration of the secondary battery.

Figure 3:
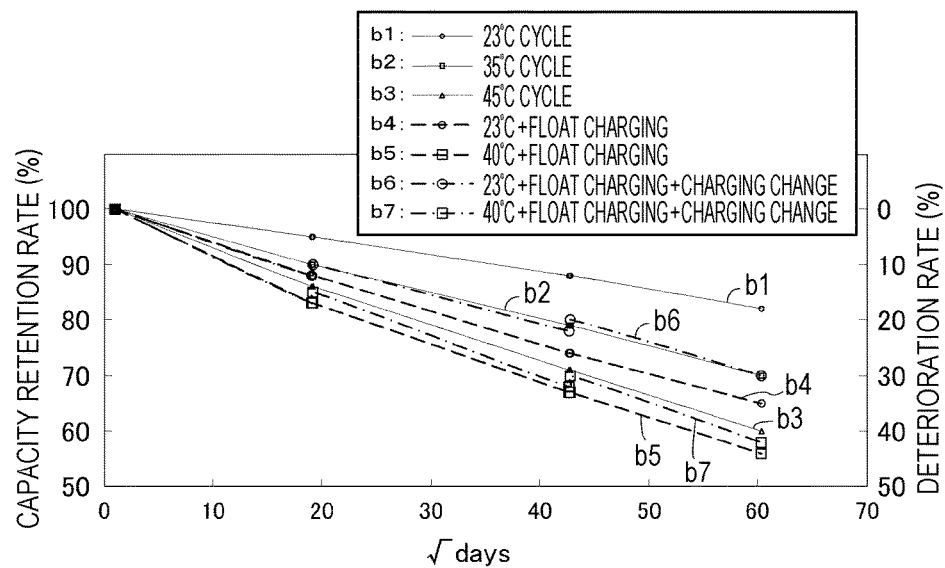
FIG. 3 is a graph illustrating the variation in the capacity retention rate of the lithium ion secondary battery.

FIG. 3 is a graph illustrating the variation in the capacity retention rate of a lithium ion secondary battery. In the graph, results (a variation in the capacity retention rate and the deterioration rate) estimated by a root's rule are plotted on coordinates in which the horizontal axis represents √days, the left vertical axis represents the capacity retention rate, and the right vertical axis represents the deterioration rate on the basis of the following measurement results relating to a lithium ion secondary battery. The root's rule represents that the capacity deterioration of the battery is proportional to a square root of the number of cycles. In root's rule plotting according to an Arrhenius rule, a relationship of "capacity=initial value−coefficient√time (the coefficient depends on a temperature)" is satisfied. The coefficient is calculated from measurement results and a lifespan estimation expression is derived, thereby creating the graph.

(Lithium Ion Secondary Battery)

$LiFePO_4$ was used as a positive electrode active material, and graphite was used as a negative electrode active material to prepare a coin cell in a similar manner as described above.

(Charging and Discharging Test)

Lines b1 to b7 represent measurement results in a case of performing charging and discharging with respect to the coin cell, which was prepared, under the following conditions.

Line b1: Temperature condition of 23° C.
Typical charging and discharging cycle 1
Line b2: Temperature condition of 35° C.
Typical charging and discharging cycle 1
Line b3: Temperature condition of 45° C.
Typical charging and discharging cycle 1
Line b4: Temperature condition of 23° C.
Typical charging and discharging cycle 1+float charging 1
Line b5: Temperature condition of 40° C.
Typical charging and discharging cycle 1+float charging 1
Line b6: Temperature condition of 23° C.
Typical charging and discharging cycle 1+float charging 1+charging change 1
Line b7: Temperature condition of 40° C.
Typical charging and discharging cycle 1+float charging 1+charging change 1

Furthermore, the "typical charging and discharging cycle 1" is as described above. The "typical charging and discharging cycle 1+float charging 1", and the "typical charging and discharging cycle 1+float charging 1+charging change 1" are as follows.

"Typical Charging and Discharging Cycle 1+Float Charging 1"

Float charging is performed for 12 hours in full charging.

Constant-current and constant-voltage charging and constant-current discharging are performed under conditions of a charging termination voltage of 3.6 V and a discharging termination voltage of 2.0 V.

"Typical Charging and Discharging Cycle 1+Float Charging 1+Charging Change 1"

Float charging is performed for 12 hours in full charging.

Constant-current and constant-voltage charging and constant-current discharging are performed under conditions of a charging termination voltage of 3.6 V and a discharging termination voltage of 2.0 V.

Two cycles of charging and discharging are performed under a condition in which a charging voltage is reduced by 0.1 V for every 100 charging and discharging times. That is, for every 100 charging and discharging times, the constant-current and constant-voltage charging and the constant-current discharging are performed under conditions of a charging termination voltage of 3.5 V and a discharging termination voltage of 2.0 V.

According to b1, b2, and b3 in FIG. 3, it can be seen that as a temperature rises, capacity deterioration becomes greater. According to b1 and b4, it can be seen that capacity deterioration increases in a case of performing float charging. According to b4 and b6, and b5 and b7, it can be seen that it is possible to reduce capacity deterioration in a case of performing charging change.

(Difference in Capacity Deterioration Due to Positive Electrode Active Material Species)

Figure 4:
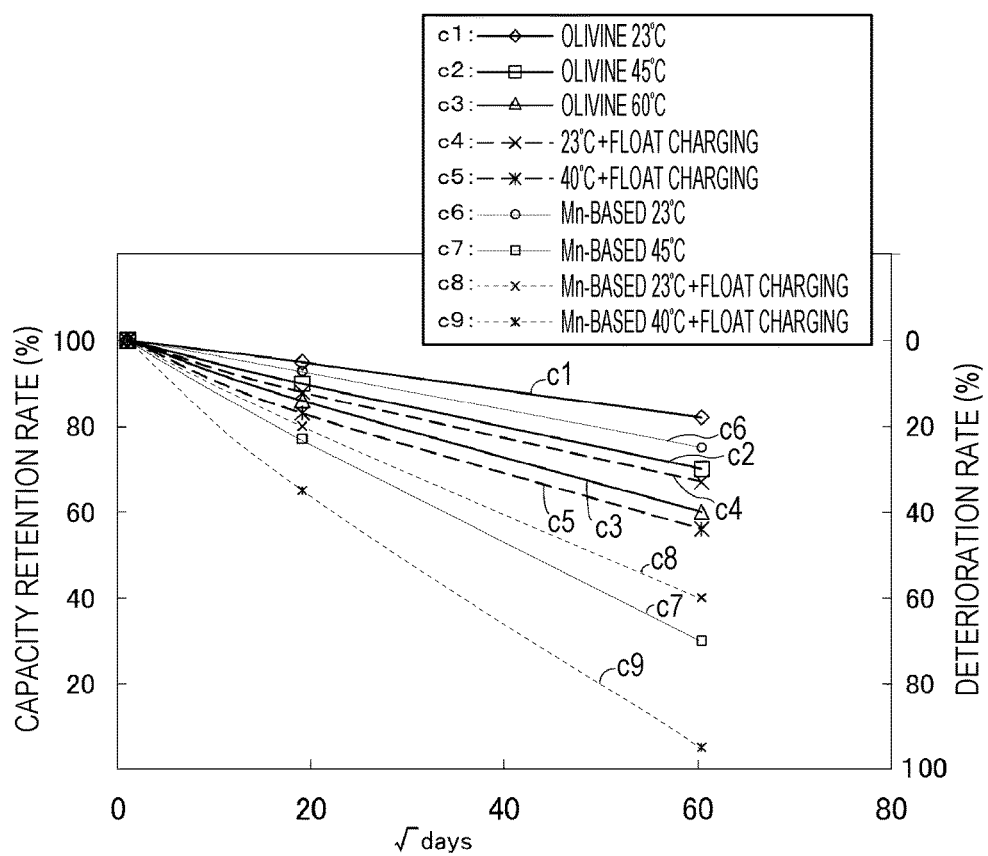
FIG. 4 is a graph illustrating the variation in the capacity retention rate of the lithium ion secondary battery.

FIG. 4 is a graph illustrating a variation in a capacity retention rate of a secondary battery. In the graph, results (a variation in the capacity retention rate and the deterioration rate) estimated by a root's rule are plotted on coordinates in which the horizontal axis represents √days, the left vertical axis represents the capacity retention rate, and the right vertical axis represents the deterioration rate on the basis of the following measurement results relating to a lithium ion secondary battery.

(Lithium Ion Secondary Battery)

LiFePO$_4$ was used as a positive electrode active material, and graphite was used as a negative electrode active material to prepare a coin cell in a similar manner as described above. A coin cell was prepared in a similar manner as described above except that LiMn$_2$O$_4$ was used instead of LiFePO$_4$ as the positive electrode active material.

(Charging and Discharging Test)

Lines c1 to c9 represent measurement results in a case of performing charging and discharging with respect to the coin cells, which were prepared, under the following conditions.

Line c1: Temperature condition of 23° C.
  Typical charging and discharging cycle 1 Positive electrode active material: LiFePO$_4$
Line c2: Temperature condition of 45° C.
  Typical charging and discharging cycle 1 Positive electrode active material: LiFePO$_4$
Line c3: Temperature condition of 60° C.
  Typical charging and discharging cycle 1
  Positive electrode active material: LiFePO$_4$
Line c4: Temperature condition of 23° C.
  Typical charging and discharging cycle 1+float charging 1
  Positive electrode active material: LiFePO$_4$
Line c5: Temperature condition of 40° C.
  Typical charging and discharging cycle 1+float charging 1
  Positive electrode active material: LiFePO$_4$
Line c6: Temperature condition of 23° C.
  Typical charging and discharging cycle 2
  Positive electrode active material: LiMn$_2$O$_4$
Line c7: Temperature condition of 45° C.
  Typical charging and discharging cycle 2
  Positive electrode active material: LiMn$_2$O$_4$
Line c8: Temperature condition of 23° C.
  Typical charging and discharging cycle 2+float charging 2
  Positive electrode active material: LiMn$_2$O$_4$
Line c9: Temperature condition of 40° C.
  Typical charging and discharging cycle 2+float charging 2
  Positive electrode active material: LiMn$_2$O$_4$ Furthermore, the "typical charging and discharging cycle 1" and the "typical charging and discharging cycle 1+float charging 1" are as described above.

The "typical charging and discharging cycle 2" and the "typical charging and discharging cycle 2+float charging 2" are as follows.

"Typical Charging and Discharging Cycle 2"

Charging and discharging are continuously performed.

Constant-current and constant-voltage charging and constant-current discharging are performed under conditions of a charging termination voltage of 4.2 V and a discharging termination voltage of 3.0 V.

"Typical Charging and Discharging Cycle 2+Float Charging 2"

Float charging is performed for 12 hours in full charging.

Constant-current and constant-voltage charging and constant-current discharging are performed under conditions of a charging termination voltage of 4.2 V and a discharging termination voltage of 3.0 V.

"Typical Charging and Discharging Cycle 2+Float Charging 2+Charging Change 1"

Float charging is performed for 12 hours in full charging.

Constant-current and constant-voltage charging and constant-current discharging are performed under conditions of a charging termination voltage of 4.2 V and a discharging termination voltage of 3.0 V.

Two cycles of charging and discharging are performed under a condition in which a charging voltage is reduced by 0.1 V for every 100 charging and discharging times. That is, for every 100 charging and discharging times, the constant-current and constant-voltage charging and the constant-current discharging are performed under conditions of a charging termination voltage of 4.1 V and a discharging termination voltage of 3.0 V.

According to c1 to c9 in FIG. 4, in a spinel manganese-based battery (a lithium ion secondary battery using a positive electrode active material having a spinel-type structure), it can be seen that capacity deterioration rapidly progresses in a case of performing the float charging. The reason for this is as follows. In the spinel manganese-based battery, an electrode deteriorates, and an active material is eluted due to the float charging and is deposited on a negative electrode side. As a result, the capacity deterioration is promoted. In this battery system, even when charging change is performed, a deterioration suppressing effect is further reduced in comparison to other battery systems. Accordingly, it can be seen that the charging and discharging method according to the present technology can further exhibit the effect due to change of charging and discharging conditions in a lithium ion secondary battery that uses a positive electrode active material (for example, LiM1O$_2$ (M1 represents Co, Mn, V, P, Si, and the like) having a layered rock salt type structure, or a positive electrode active material having an olivine type structure.

(Examples of Operation of Electrical Storage System)

Figure 5:
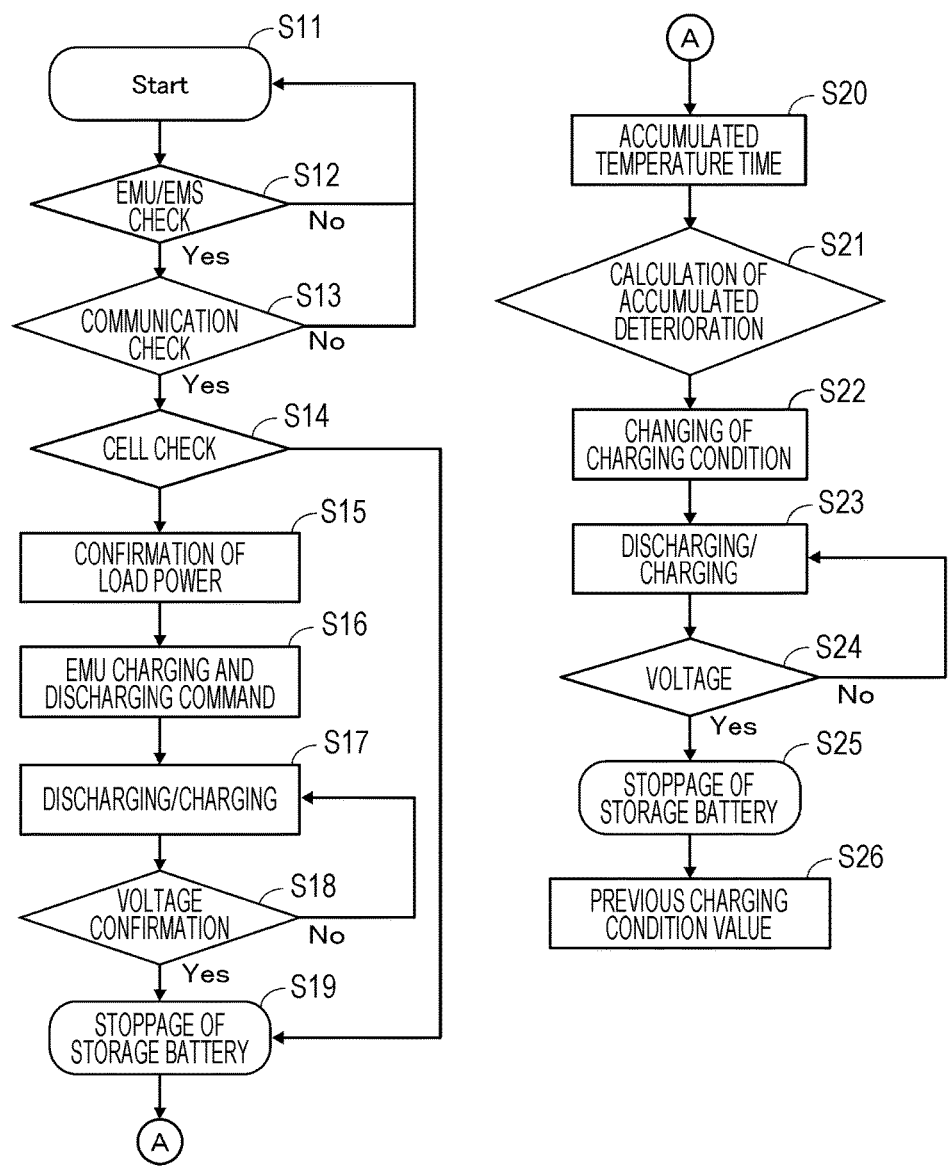
FIG. 5 is a flowchart illustrating an operation of an electrical storage system.

Description will be given of an example of an operation of the above-described electrical storage system with reference to FIG. 5. In step S12, the controller 83 (energy management unit (EMU)) in the electrical storage system 81 checks activation of the controller 83 and activation of a system controller (energy management system (EMS), not illustrated) that is a higher-layer controller of the controller 83.

In step S13, the controller 83 performs communication check. In the communication check, the controller 83 confirms whether or not a communication between a system controller, the main micro control unit 40, and the sub-micro control unit 35 is normal.

In step S14, cell check is performed. In the cell check, for example, the controller 83 performs a communication to collect voltage information (V) and temperature information (T) for each sub-module SMO of the electrical storage module 82, and makes a determination on whether or not the voltage information and temperature information are in a predetermined voltage range (Vmin<V<Vmax) and a predetermined temperature range (Tmin<T<Tmax). At this time, in a case where at least one of the voltage information and the temperature information, which are collected, is out of a predetermined voltage range or out of a predetermined temperature range, it transitions to step S19. In a case where the voltage information and the temperature information, which are collected, are in the predetermined voltage range and the predetermined temperature range, it transitions to step S15.

In step S15, confirmation of load power is performed. In the confirmation of the load power, the controller 83 performs a communication with the system controller that is a higher-layer controller to confirm electric power (load value) that is necessary for an external load 15. In step S16, the controller 83 provides a charging and discharging command to the electrical storage module 82.

In step S17, the electrical storage module 82 receives the command from the controller 83, and initiates charging and discharging of the sub-module SMO. At this time, the controller 83 provides a command to the electrical storage module 82 so that charging and discharging is performed with a typical-charging voltage setting value (Vmax).

In step S18, voltage confirmation is performed. In the voltage confirmation, the controller 83 performs a communication to collect voltage information (V) and temperature information (T) for each sub-module SMO of the electrical storage module 82 to confirm whether or not the voltage information is a predetermined voltage (V=Vmin, V=Vmax). At this time, in a case where the voltage information (V) that is collected is the predetermined voltage (V=Vmin, V=Vmax), it transitions to step S19, and a charging and discharging operation is stopped for every sub-module SMO of which a voltage reaches the predetermined voltage. In a case where the voltage does not reach the predetermined voltage (V=Vmin, V=Vmax), it returns to step S17, and the charging and discharging operation is continued for every sub-module SMO of which a voltage does not reach the predetermined voltage.

In step S20, the controller 83 collects historical information of the electrical storage module 82. In step S21, the controller 83 performs accumulated deterioration calculation. In a case where an accumulated deterioration value $D_T$ (out-of-temperature-range accumulated time) of a temperature condition, which is calculated by the accumulated deterioration calculation, is greater than a threshold value, it transitions to step S22. In addition, also in a case where an accumulated cycle value Dc (the number of charging and discharging cycles) is greater than a predetermined number of cycles, it transitions to step S22. Furthermore, in a case where the accumulated deterioration value $D_T$ is not greater than the threshold value, and in a case where the accumulated cycle value Dc is not greater than a predetermined number of cycles, it returns to step S14.

In step S22, the controller 83 performs change of charging and discharging conditions. In the change of charging and discharging conditions, the controller 83 provides a command of changing a charging voltage setting value for every sub-module SMO, and changes the charging voltage setting value with respect to each sub-module SMO. Accordingly, the charging voltage setting value is set to low-charging voltage value (Vmax'). In step S23, the electrical storage module 82 receives a command from the controller 83, and initiates charging and discharging of the sub-module SMO.

In step S24, voltage information (V) and temperature information (T) for every sub-module SMO of the electrical storage module 82 are collected, and determination is made on whether or not the voltage information is in a predetermined voltage range (Vmin<V<Vmax'). At this time, in a case where the voltage information that is collected is in the predetermined voltage range, it returns to step S23, and charging and discharging is continued for every sub-module SMO of which a voltage is in the predetermined voltage range. In a case where the voltage information that is collected is out of the predetermined voltage range (Vmin<V<Vmax'), it transitions to step S25 and a charging and discharging operation is stopped for every sub-module SMO of which a voltage reaches the predetermined voltage. In step S26, the controller 83 provides a command of changing a charging voltage setting value for every sub-module SMO, and changes the charging voltage setting value with respect to each sub-module SMO. Accordingly, the charging voltage setting value is set to a previous value, that is, the typical-charging voltage value (Vmax). Then, it returns to step S14.

In the electrical storage system according to the first embodiment of the present technology, the charging and discharging method according to the present technology is executed, and thus it is possible to suppress capacity deterioration without allowing a user to recognize a temporal capacity decrease due to voltage change. For example, it is possible to operate a storage battery in a state of rarely having an effect on actual operation time and capacity in an actual operation. As a result, it is possible to provide an electrical storage system in which a lifespan performance is sufficiently satisfied.

2. Second Embodiment

Description will be given of deterioration prediction according to the second embodiment of the present technology. Furthermore, the deterioration prediction according to the present technology may be applied to the electrical storage system according to the first embodiment of the present technology in combination with the charging and discharging method according to the present technology. In addition, the deterioration prediction may be applied alone to the electrical storage system according to the first embodiment of the present technology. In this case, an operation of the deterioration prediction may be performed by at least one of the controller 83 and the electrical storage module 82. In addition, the deterioration prediction according to the present technology may be applied to a storage battery, a battery pack that uses the storage battery, a storage battery-embedded electronic apparatus, and the like. Hereinafter, description will be given of an example in which the deterioration prediction according to the second embodiment of the present technology is applied to the storage battery.

(Overview of Deterioration Prediction)

Figure 6:
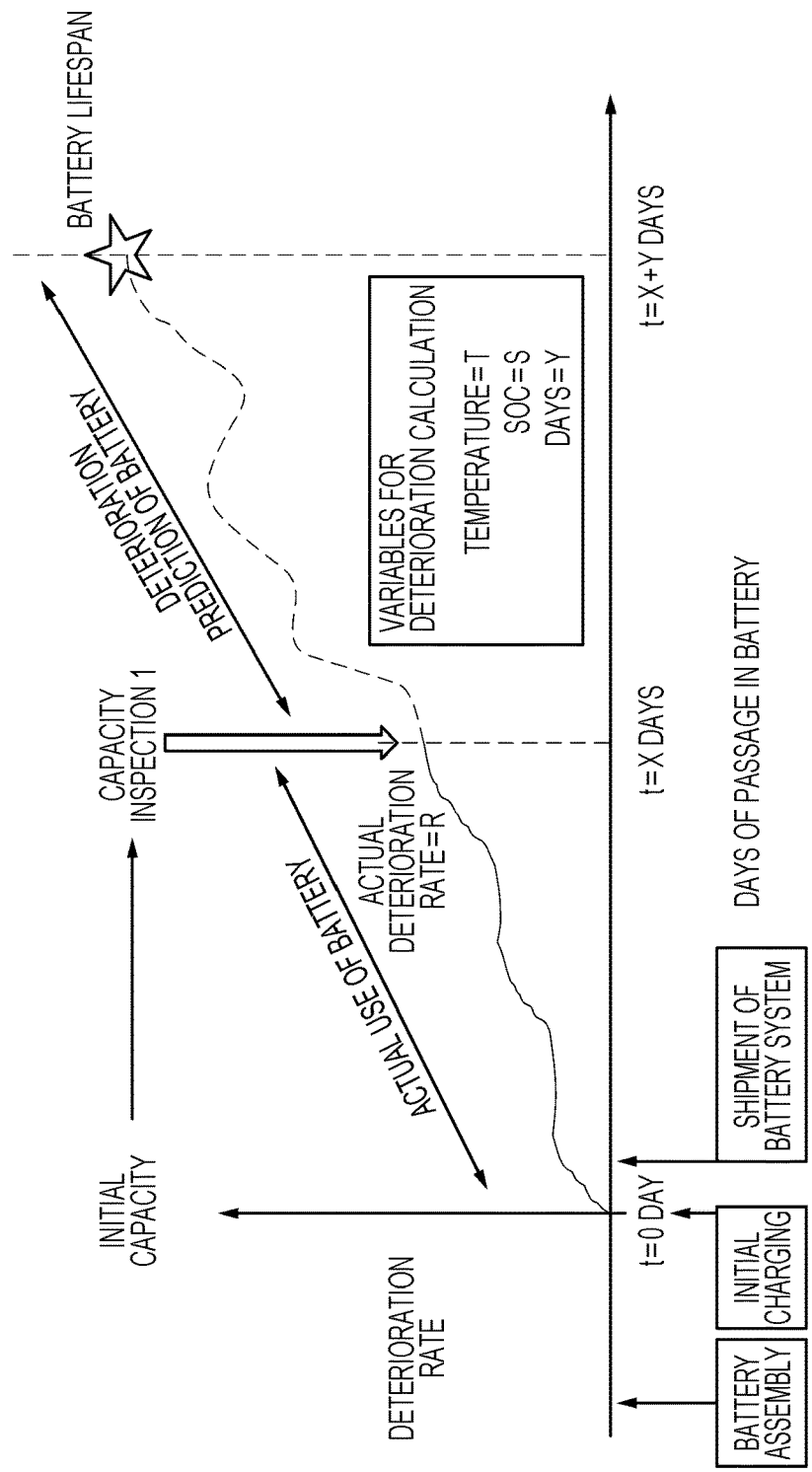
FIG. 6 is a schematic diagram that is used in description of a method of estimating a deterioration lifespan of the lithium ion secondary battery.

Description will be given of the overview of the deterioration prediction according to the second embodiment of the present technology with reference to FIG. 6. FIG. 6 illustrates a relationship between passage of time and a deterioration rate. Battery electrodes and an electrolytic solution are hermetically sealed with an exterior packaging body during assembly of the battery. Next, first charging (referred to as "initial charging") corresponding to 50% or greater of rated capacity in the battery is performed. Capacity in a non-use state is set as initial capacity Capa(0), capacity after X days from the initial charging is set as Capa(x), and a deterioration rate Rafter t days from the initial charging is expressed as follows.

$$R=100-\{100\times Capa(x)/Capa(0)\}(0\le R\le 100)$$

Furthermore, the capacity retention rate is "100 capacity deterioration rate".

In the present technology, capacity is measured on X day, and capacity deterioration rate prediction is performed on Y day (0≤X, Y). As days of X that is a reference day of lifespan prediction, a day such as a periodical battery maintenance date that is set in advance is possible without particular limitation, and days in a lifespan range of the battery may be selected. For example, in a vehicle, when a vehicle inspection date is X, and the subsequent vehicle inspection date is set to Y, it is possible to predict whether or not a battery performance can be secured to the subsequent vehicle inspection.

Y is a value that indicates that capacity deterioration is to be predicted after which days from the X date that is a reference date of the lifespan prediction, and may be arbitrarily selected in correspondence with a prediction usage. In the deterioration prediction after Y days, a temperature (=T), state of charge (SOC: charging depth) (=S) or float charging, and days (=Y) are designated as conditions, and then a prediction value is calculated. Furthermore, depth of discharge (DOD: Depth Of Discharge) may be used instead of the SOC. The SOC and the DOD are collectively referred as a battery state.

In the present technology, a plurality of conditions ($Z_1$, $Z_2$, ..., $Z_n$) are permitted as a condition in the prediction period (for Y days). An accumulation method of deterioration when the condition transitions from $Z_{n-1}$ to $Z_n$ will be described below.

For example, a positive electrode active material having an olivine type structure as an example of a positive electrode active material that is used in a battery, and the like are very excellent in chemical stability. That is, deterioration with the passage of time, which is caused by the positive electrode, is as small as negligible, and a cell capacity loss is determined by the lost amount of lithium due to a sub-reaction on a negative electrode graphite surface. Accordingly, in a case of additionally and continuously using a cell that deteriorates to a capacity deterioration rate R % under other conditions, it can be regarded that the lost amount of lithium, which corresponds to the deterioration rate R %, will be handed over to the subsequent use initiation. As a result, it is possible to add a deterioration rate in a case of switching conditions.

Figure 7:
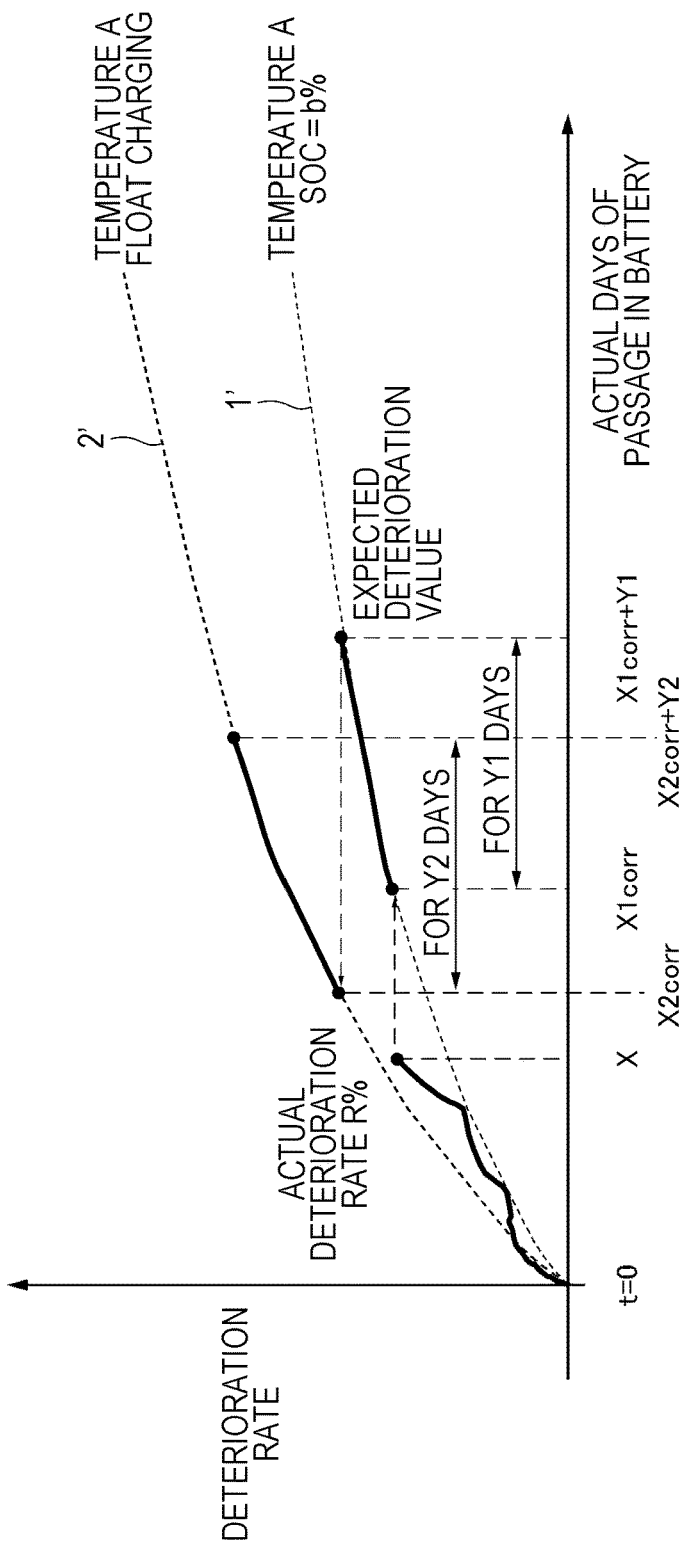
FIG. 7 is a schematic diagram that is used in description of the method of estimating the deterioration lifespan of the lithium ion secondary battery.

As an example, a deterioration rate after actual use for X days is set as R %, and deterioration prediction values in a case where a period of Y1, a temperature of T=A° C., and a SOC (S=b %) are set as conditions and a period Y2, a temperature of T=B° C., and float charging are set as conditions are obtained. In FIG. 7, a broken-line curve 1' represents a deterioration master curve corresponding to new conditions (T=A° C., S=b %) in a case of performing deterioration prediction. The deterioration master curve is obtained in advance by a mathematical expression, and is stored in a nonvolatile memory as a table. Accordingly, a deterioration prediction value can be obtained with reference to the table. Alternatively, the deterioration prediction value can be obtained by a mathematical expression (program). When conditions are designated, a corresponding deterioration master curve is determined.

In the deterioration master curve 1' under new conditions of performing the deterioration prediction, new passage of time from a point (a point on X1corr day) corresponding to the deterioration rate R % is set to Y1 days, and a deterioration prediction value after Y1 days is obtained. That is, in the present technology, days of passage is set to X1corr at a point at which an actual deterioration rate R (%) intersects the deterioration master curve 1' after movement in parallel to the horizontal axis (days of passage in a battery). In this manner, a switching day into new conditions is not set to X, and is converted into a new day of X1corr.

In addition, a deterioration rate for X1corr+Y1 days can be obtained. Next, setting is made to passage of Y2 days under conditions of a temperature of A° C. and float charging, A deterioration master curve 2' is selected in correspondence with the conditions. Days X2corr at a point, at which the deterioration prediction value intersects the deterioration master curve 2' after movement in parallel to the horizontal axis (days of passage in the battery), are set as a switching day into new conditions. It is predicted that a deterioration rate varies as illustrated on the deterioration master curve 2' in a period for Y2 days from X2corr.

The deterioration master curve represents a variation curve of a battery capacity deterioration rate with respect to time in a case of storing (cycling) a battery at a constant temperature and with constant SOC (or DOD), or in a case of performing float charging. The deterioration master curve may be obtained by actual deterioration data of a battery, but the number of pieces of data necessary is great and a collection period of data with the passage of time is as long as approximately 10 years. Accordingly, it is not realistic to construct the deterioration master curve with only measured data.

The deterioration master data in the present technology is a value that is obtained through calculation, preferably, on the basis of a mathematical expression. More preferably, the deterioration master data is a value that is calculated from a product of a value that is calculated from a temperature of an outer wall of the battery, a value that is calculated from days of passage after initial charging of the battery, and a value that is calculated from a battery state of the battery, for example, SOC.

Still more preferably, the value, which is calculated from the temperature T of the outer wall of the battery, is calculated by an expression including $\exp(-A/T)$ (T represents an absolute temperature). The value, which is calculated from the days of passage after initial charging of the battery is calculated by an expression including (days of passage)^B (^ represents the power) (provided that, 0.3<B<0.7). The value, which is calculated from the charging depth SOC of the battery, is calculated by an expression including $\exp(C \times SOC/T)$. A, B, and C are preferably obtained by fitting of measured data with the passage of time in the battery. C represents dependency of deterioration on time, and C is 0.1 to 1.5, and preferably 0.35 to 0.65.

In the expression of the deterioration master curve in the present technology, the temperature T represents a temperature of an outer surface of a battery cell instead of an environmental temperature at which the battery cell is left. In the expression of the deterioration master curve in the present technology, with regard to the SOC, in a case of storage, SOC in storage may be used as is, and in a case where the SOC varies with the passage of time in cycles and the like, a time average value in an SOC range may be used. Furthermore, the number of times of cycles in days of passage has no relation with prediction of deterioration lifespan as long as the time average value of the SOC is the same as in each case.

In a case where deterioration does not linearly vary with respect to the SOC, it is preferable to take a weight average to each SOC point. For example, when considering that a measured deterioration value or capacity deterioration occurs in a reducing sub-reaction on negative electrode graphite, a deterioration rate ratio is obtained for every SOC by the following expression, and weighting can be performed to each SOC variation point by the deterioration rate ratio.

The deterioration rate ratio for every SOC is obtained by using an expression of specific deterioration rate=$\exp(\alpha F\eta/RT)$ (here, η represents (negative electrode graphite potential in 1-against Li), α=0.5, R=8.314, F=96485, and T: battery temperature)(K°), and weighting can be performed to each SOC variation point by the deterioration rate ratio.

[Example of Deterioration Prediction]

Figure 8:
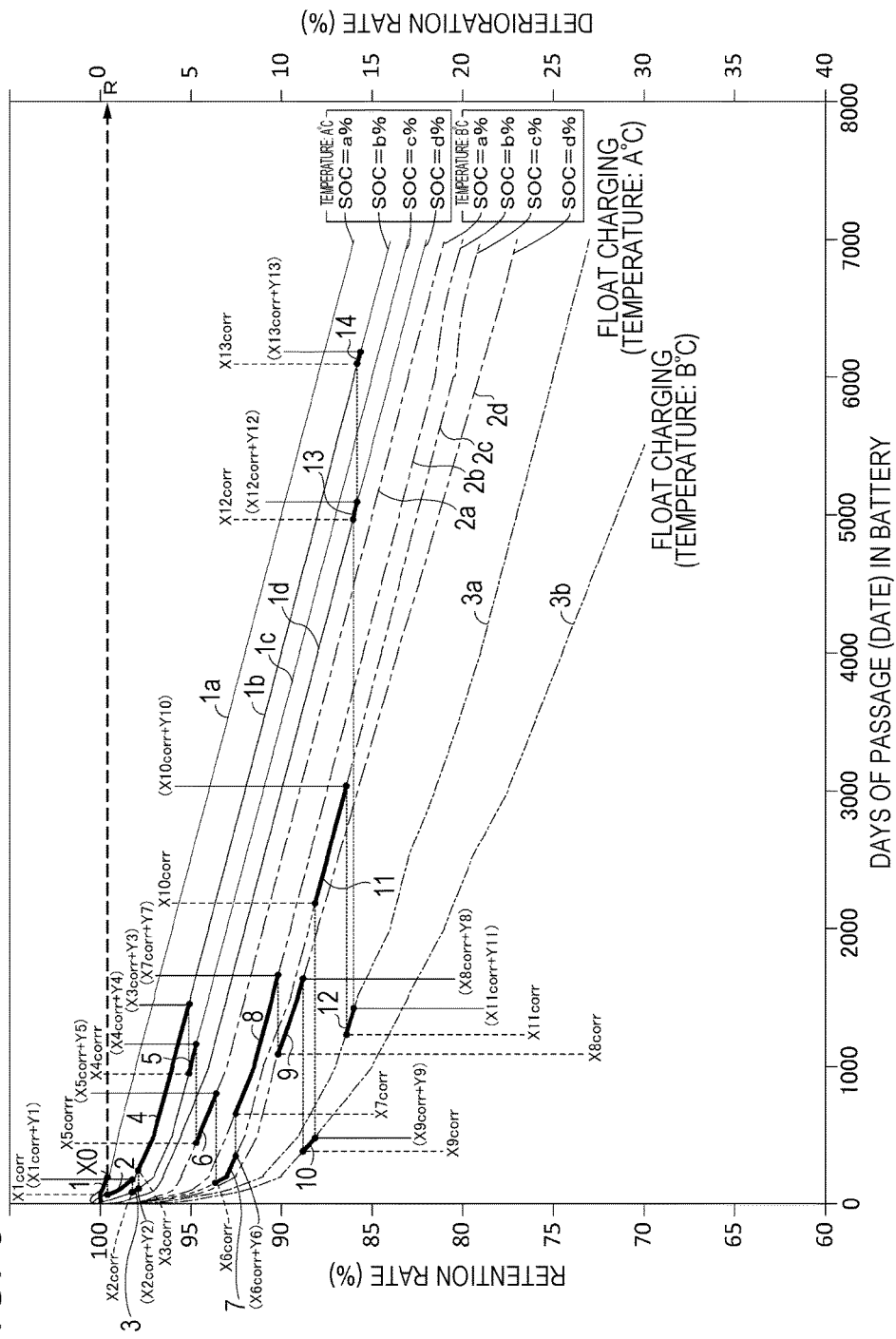
FIG. 8 is a schematic diagram that is used in description of an estimation method in a case where a plurality of conditions transition as a lifespan estimation method according to the present technology.

Description will be given of an example of deterioration prediction with reference to FIG. 8. In FIG. 8, deterioration master curves 1a, 1b, 1c, and 1d, deterioration master curves 2a, 2b, 2c, and 2d, and deterioration master curves 3a and 3b are illustrated. The deterioration master curves 1a to 1d are deterioration master curves in a case where a temperature T is A° C., and SOC corresponds to a %, b %, c %, and d % (a %<b %<c %<d %).

The deterioration master curves 2a to 2d are deterioration master curves in a case where the temperature T is B° C. (A° C.<B° C.), and SOC corresponds to a %, b %, c %, and d %. The deterioration master curve 3a is a deterioration master curve in a case of float charging at the temperature T of A° C. The deterioration master curve 3b is a deterioration master curve in a case of float charging at the temperature T of B° C. Furthermore, for example, A is 23° C. and B is 35° C.

In FIG. 8, bold lines 1 to 14 represent variation transition of a capacity retention rate (may be simply referred to as "retention rate") as described below. Furthermore, a deterioration rate is obtained by an expression of "100 retention rate".

Days of passage in a battery on the horizontal axis is set as "t". Initial charging is performed at t=0. As illustrated in the curve 1a, a battery is actually used to (t=X0 days), and actual capacity measurement of the battery is performed. In addition, an actual deterioration rate R %, which is obtained by "100−retention rate" is obtained.

Next, setting is made to passage of Y1 days under conditions of (temperature is A° C. and SOC is b %). Setting is made by a user. The deterioration master curve 1b is selected in correspondence with the conditions. As described above, in a case where a battery, which deteriorates to the capacity deterioration rate R %, is additionally and continuously used under other conditions, it can be regarded that the lost amount of lithium corresponding to the deterioration rate R % will be handed over to the subsequent use initiation. Accordingly, days X1corr at a point, at which the actual deterioration rate R (%) intersects the deterioration master curve 1b after movement in parallel to the horizontal axis (days of passage in the battery), become a switching day into new conditions. It is predicted that the deterioration rate varies as indicated by the bold line 2 on the deterioration master curve 1b in a period of Y1 days from X1corr. The number of times of charging/discharging in the period of Y1 days may be arbitrary. This is also true of other storage periods.

Next, setting is made to passage of Y2 days under conditions (temperature of A° C. and SOC of c %). The deterioration master curve 1c is selected in correspondence with the conditions. Days X1corr at a point, at which a deterioration prediction value at a terminal end of the bold line 2 intersects the deterioration master curve 1c after movement in parallel to the horizontal axis (days of passage in a battery), become a switching day into new conditions. It is predicted that the deterioration rate varies as indicated by the bold line 3 on the deterioration master curve 1c in a period of Y2 days from X2corr.

Next, setting is made to passage of Y3 days under conditions (temperature of A° C. and SOC of b %). The deterioration master curve 1b is selected in correspondence with the conditions. Days X3corr at a point, at which a deterioration prediction value at a terminal end of the bold line 3 intersects the deterioration master curve 1b after movement in parallel to the horizontal axis (days of passage in a battery), become a switching day into new conditions. It is predicted that the deterioration rate varies as indicated by the bold line 4 on the deterioration master curve 1b in a period of Y3 days from X3corr.

Next, setting is made to passage of Y4 days under conditions (temperature of A° C. and SOC of c %). The deterioration master curve 1c is selected in correspondence with the conditions. Days X4corr at a point, at which a deterioration prediction value at a terminal end of the bold line 4 intersects the deterioration master curve 1c after movement in parallel to the horizontal axis (days of passage in a battery), become a switching day into new conditions. It is predicted that the deterioration rate varies as indicated by the bold line 5 on the deterioration master curve 1c in a period of Y4 days from X4corr.

Next, setting is made to passage of Y5 days under conditions (temperature of B° C. and SOC of a %). The deterioration master curve 2a is selected in correspondence with the conditions. Days X5corr at a point, at which a deterioration prediction value at a terminal end of the bold line 5 intersects the deterioration master curve 2a after movement in parallel to the horizontal axis (days of passage in a battery), become a switching day into new conditions. It is predicted that the deterioration rate varies as indicated by the bold line 6 on the deterioration master curve 2a in a period of Y5 days from X5corr.

Next, setting is made to passage of Y6 days under conditions (temperature of B° C. and SOC of c %). The deterioration master curve 2c is selected in correspondence with the conditions. Days X6corr at a point, at which a deterioration prediction value at a terminal end of the bold line 6 intersects the deterioration master curve 2c after movement in parallel to the horizontal axis (days of passage in a battery), become a switching day into new conditions. It is predicted that the deterioration rate varies as indicated by the bold line 7 on the deterioration master curve 2c in a period of Y6 days from X6corr.

Next, setting is made to passage of Y7 days under conditions (temperature of B° C. and SOC of b %). The deterioration master curve 2b is selected in correspondence with the conditions. Days X7corr at a point, at which a deterioration prediction value at a terminal end of the bold line 7 intersects the deterioration master curve 2b after movement in parallel to the horizontal axis (days of passage in a battery), become a switching day into new conditions. It is predicted that the deterioration rate varies as indicated by the bold line 8 on the deterioration master curve 2b in a period of Y7 days from X7corr.

Next, setting is made to passage of Y8 days under conditions (temperature of B° C. and SOC of d %). The deterioration master curve 2d is selected in correspondence with the conditions. Days X8corr at a point, at which a deterioration prediction value at a terminal end of the bold line 8 intersects the deterioration master curve 2d after movement in parallel to the horizontal axis (days of passage in a battery), become a switching day into new conditions. It is predicted that the deterioration rate varies as indicated by the bold line 9 on the deterioration master curve 2d in a period of Y8 days from X8corr.

Next, setting is made to passage of Y9 days under conditions (temperature of B° C. and float charging). The deterioration master curve 3b is selected in correspondence with the conditions. Days X9corr at a point, at which a deterioration prediction value at a terminal end of the bold line 9 intersects the deterioration master curve 3b after movement in parallel to the horizontal axis (days of passage in a battery), become a switching day into new conditions. It is predicted that the deterioration rate varies as indicated by the bold line 10 on the deterioration master curve 3b in a period of Y9 days from X9corr.

Next, setting is made to passage of Y10 days under conditions (temperature of B° C. and SOC of c %). The deterioration master curve 2c is selected in correspondence with the conditions. Days X10corr at a point, at which a deterioration prediction value at a terminal end of the bold line 10 intersects the deterioration master curve 2c after movement in parallel to the horizontal axis (days of passage in a battery), become a switching day into new conditions. It is predicted that the deterioration rate varies as indicated by the bold line 11 on the deterioration master curve 2c in a period of Y10 days from X10corr.

Next, setting is made to passage of Y11 days under conditions (temperature of A° C. and float charging). The deterioration master curve 3a is selected in correspondence with the conditions. Days X11corr at a point, at which a deterioration prediction value at a terminal end of the bold line 11 intersects the deterioration master curve 3a after movement in parallel to the horizontal axis (days of passage in a battery), become a switching day into new conditions. It is predicted that the deterioration rate varies as indicated by the bold line 12 on the deterioration master curve 3a in a period of Y11 days from X11corr.

Next, setting is made to passage of Y12 days under conditions (temperature of A° C. and SOC of d %). The deterioration master curve 1d is selected in correspondence with the conditions. Days X12corr at a point, at which a deterioration prediction value at a terminal end of the bold line 12 intersects the deterioration master curve 1d after movement in parallel to the horizontal axis (days of passage in a battery), become a switching day into new conditions. It is predicted that the deterioration rate varies as indicated by the bold line 13 on the deterioration master curve 1d in a period of Y12 days from X12corr.

Next, setting is made to passage of Y13 days under conditions (temperature of A° C. and SOC of b %). The deterioration master curve 1b is selected in correspondence with the conditions. Days X13corr at a point, at which a deterioration prediction value at a terminal end of the bold line 13 intersects the deterioration master curve 1b after movement in parallel to the horizontal axis (days of passage in a battery), become a switching day into new conditions. It is predicted that the deterioration rate varies as indicated by the bold line 14 on the deterioration master curve 1b in a period of Y13 days from X13corr.

From the results of the above-described processing, deterioration prediction values of a battery at a point of time of X0 days after days of passage (Y1+Y2+Y3+Y4+Y5+Y6+Y7+Y8+Y9+Y10+Y11+Y12+Y13) from a point of time of X0 day. For example, in a case of a battery that is mounted on an electrically driven vehicle, when X0 is a point of time of current vehicle inspection, and a point of time after passage of the above-described days is a scheduled date of vehicle inspection, it is possible to predict a battery deterioration rate in vehicle inspection. The above-described condition transition is illustrative only, and various transitions are also possible. However, it is possible to set condition transition in conformity to actual sites in consideration of actual conditions such as the kind of electrical storage devices (an electrically driven vehicle, a hybrid car, an electrical storage device in home, and the like), use of the battery (business use, home use, and the like), and a use region (a cold region, a warm region, and the like). For example, a vehicle maker and the like can provide information related to the condition transition.

Figure 9:
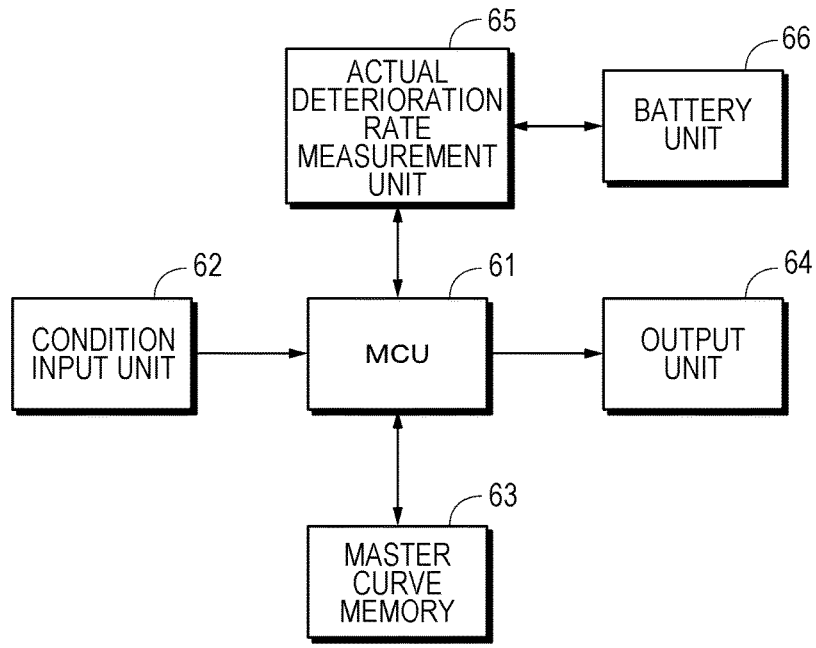
FIG. 9 is a block diagram schematically illustrating a circuit configuration for realization of deterioration prediction that is applied to an electrical storage system according to the present technology.

FIG. 9 schematically illustrates a circuit configuration for realization of deterioration prediction according to the present technology. In FIG. 9, condition transition information is input from a condition input unit 62 to a microcontrol unit (noted as "MCU" in FIG. 9) 61. As described above, conditions of (a temperature, SOC, float charging, and days of passage) are input. Typically, a plurality of conditions are sequentially input.

Deterioration master curve data is input from a master curve memory (nonvolatile memory) 63 to the microcontrol unit 61. For example, the deterioration master curve data is data obtained by performing fitting of measured data with the passage of time in a battery with respect to data obtained with a mathematical expression, and by performing weighting to each SOC variation point by a deterioration rate ratio obtained for every SOCs, and the like. The deterioration master curve is stored in advance.

In addition, actual deterioration rate data, which is measured, is supplied from an actual deterioration rate measurement unit 65 to the microcontrol unit 61. The actual deterioration rate measurement unit 65 measures a deterioration rate of a battery unit 66 at a current point of time. An output unit 64 is connected to the microcontrol unit 61, and a deterioration prediction value in conditions, which is set, is displayed by the output unit 64, or the deterioration prediction value is printed.

Figure 10:
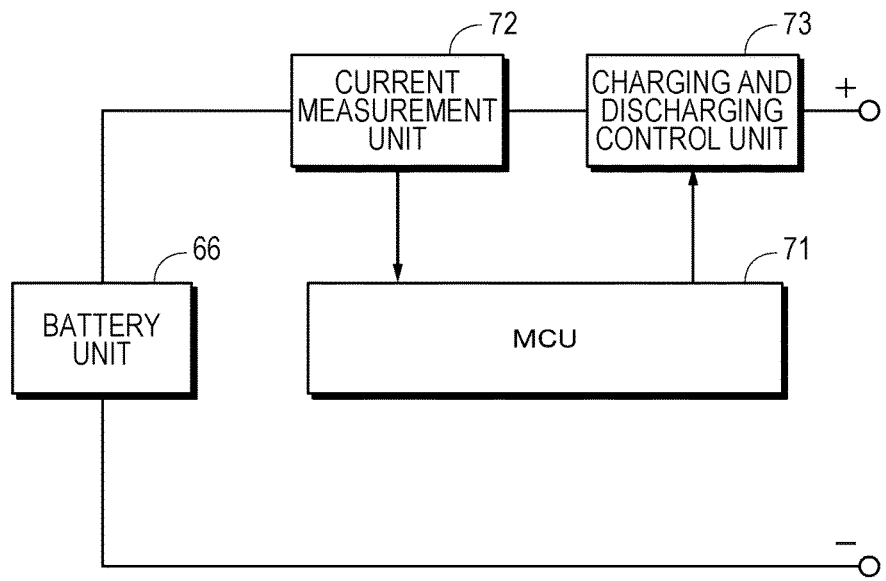
FIG. 10 is a block diagram of an example of an actual deterioration rate measurement unit according to the present technology.

Schematically, the actual deterioration rate measurement unit 65 has a configuration illustrated in FIG. 10. A current measurement unit 72 and a charging and discharging control unit 73 are inserted in a current path of the battery unit 66. A current (a charging current or a discharging current), which is measured by the current measurement unit 72, is supplied to a microcontrol unit 71. The microcontrol unit 71 generates a control signal for a control of the charging and discharging control unit 73.

Data of initial capacity Capa(0) is stored in a nonvolatile memory in the microcontrol unit 71. For example, the microcontrol unit 71 integrates discharging currents in a case where the battery unit 66 is charged to full-charging and is completely discharged from the full-charging to obtain capacity Capa(x) after X days from initial charging. In addition, the actual deterioration rate R % is obtained from the following expression.

$$R=100-100\times Capa(x)/Capa(0)(0\leq R\leq 100)$$

A capacity retention rate is "100−capacity deterioration rate".

In the above-described actual deterioration rate measurement method, capacity from a fully charged state (SOC=100%) to a completely discharged state (SOC=0%) is measured. A deterioration state can be obtained by comparing the capacity in use of battery with battery capacity before use initiation.

However, when the battery is made to a fully discharged state by performing the measurement simultaneously with actual use of the battery, for example, in a battery for a vehicle, the vehicle loses traveling capacity, and in a battery for a backup power supply, backup capability is lost. This situation is not permissible. Accordingly, in case of using of an apparatus, the deterioration rate may be assumed by a method that is known in the related art as the actual deterioration rate measurement method. For example, the deterioration rate of a battery may be estimated from a variation in internal resistance of the battery, voltage drop of the battery, and the like.

In the deterioration prediction according to the present technology, it is possible to provide deterioration prediction in consideration of capacity deterioration in float charging. In the deterioration prediction according to the present technology, it is considered that accumulated time in retention in a high-voltage region during charging has a great deterioration effect on the lifespan of a storage battery in case of performing float charging in combination with a cycle history and storage history, and it is possible to more accurately estimate an actual lifespan of the storage battery by grasping the time in retention in the high-voltage region. "Exceeding over passed accumulated time predicted by the deterioration prediction (lifespan prediction)" may be added as one of the above-described conditions, and in a case where at least one condition among the conditions is satisfied, it may be determined that deterioration is in progress, and the typical charging and discharging cycle may be changed to the low-voltage charging and discharging cycle.

However, a lifespan estimation method of estimating deterioration of the storage battery with a temperature history is described in Japanese Patent Application Laid-Open No. 2014-81238 (Patent Document 1). A method of estimating the lifespan of the storage battery on the basis of an expression of an Arrhenius rule is described in Japanese Patent Application Laid-Open No. 2003-161768. A method of estimating the lifespan of the storage battery on the basis of a charging and discharging cycle, a temperature, and the expression of the Arrhenius rule is described in Japanese Patent Application Laid-Open No. 2009-244025. Setting of a predetermined charging voltage and a second charging voltage is described in Japanese Patent Application Laid-Open No. 2003-7349. Japanese Patent Application Laid-Open No. 2007-325324 describes a configuration in which a setting voltage is decreased at a terminal stage of battery charging after deterioration.

Any document does not describe consideration to deterioration due to float charging. The deterioration due to the float charging does not attract a particular attention in a lead battery or a nickel-hydrogen battery (NiMH), and it has been considered that capacity deterioration of a lithium ion secondary battery is mainly caused by active material deterioration in charging and discharging. However, in an olivine-based battery, in which capacity deterioration due to charging and discharging or storage is small, prediction accuracy of residual capacity and lifespan in actual use tends to decrease if a consideration is not given to the capacity deterioration due to the float charging.

In the deterioration prediction according to the second embodiment of the present technology, the deterioration prediction is performed in consideration of the deterioration due to the float charging, and thus it is possible to accurately add deterioration for time in retention and storage near full-charging. As a result, it is possible to more accurately predict the battery capacity deterioration (battery lifespan).

When actual use conditions are classified in accordance with a case, it is possible to accurately predict a lifespan by combining various use conditions. In a secondary battery, repetition of SOC 100% to SOC 50% and use in float charging near full-charging are more frequently performed in comparison to a continuous charging and discharging cycle, and thus it is possible to predict a lifespan close to relatively actual use conditions.

In addition, even in a case where the storage battery is applied to a power supply of a high-output type apparatus, it is possible to perform lifespan prediction of the storage battery. It is possible to more accurately predict an actual lifespan of a backup power supply for a UPS, and it is possible to realize deterioration prediction and a lifespan improvement by the method of the present technology.

3. Application Example

Application Example 1

Figure 11:
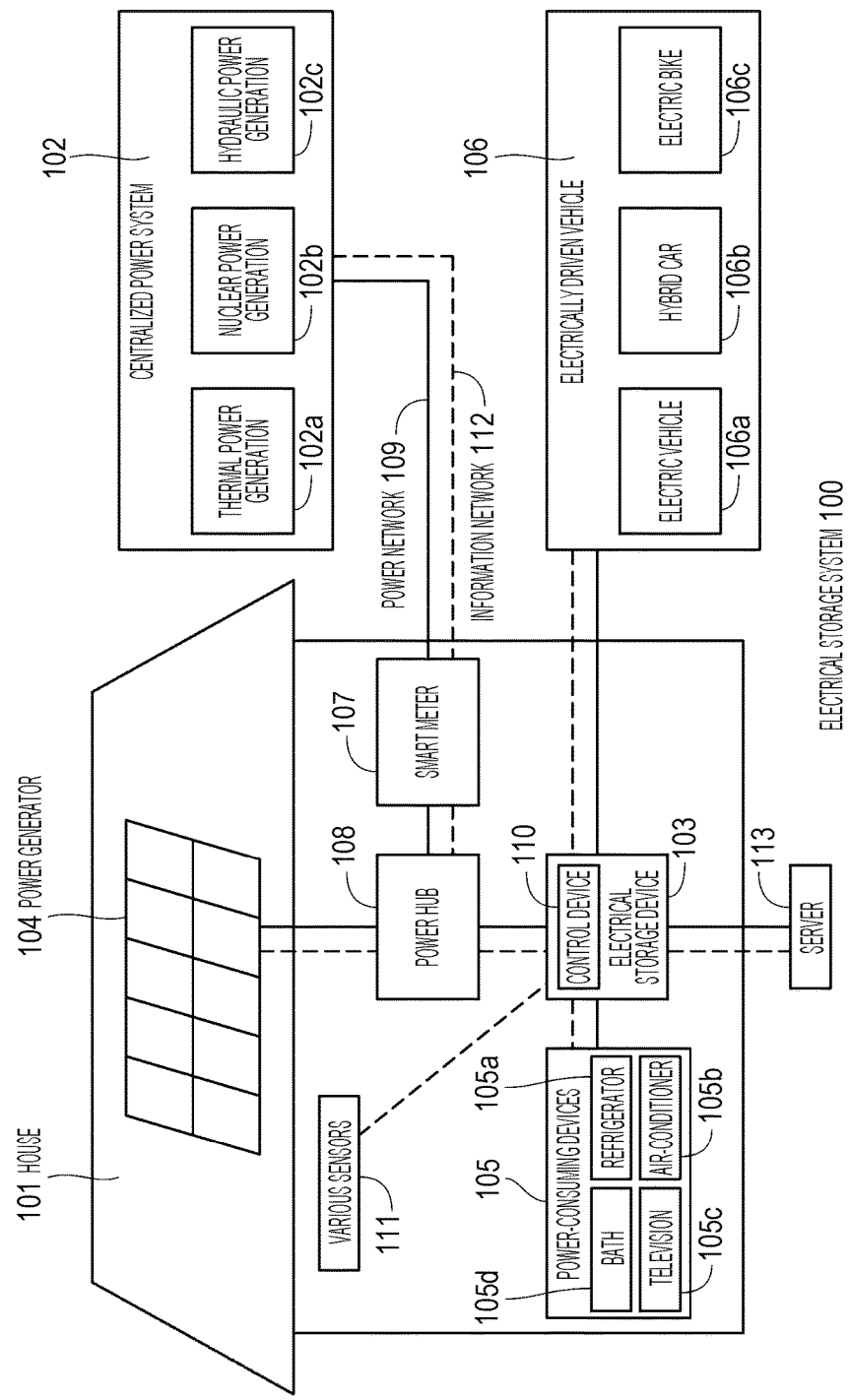
FIG. 11 is a block diagram of a first example of an application example of the present technology.

Description will be given of an example in which an electrical storage device using the battery of the present technology is applied to an electrical storage device for a house with reference to FIG. 11. For example, in an electrical storage device 100 for a house 101, electric power is supplied to an electrical storage device 103 from a centralized power system 102 such as thermal power generation 102a, nuclear power generation 102b, and hydraulic power generation 102c through a power network 109, an information network 112, a smart meter 107, a power hub 108, and the like. In addition, electric power from an independent power supply such as an in-house power generator 104 is supplied to the electrical storage device 103. The electric power supplied to the electrical storage device 103 is stored. Electric power that is used in the house 101 is supplied by using the electrical storage device 103. A similar electrical storage device may also be used with respect to a building without limitation to the house 101. In the electrical storage device 103, a plurality of electrical storage modules are connected in parallel with each other.

The in-house power generator 104, power-consuming devices 105, the electrical storage device 103, a control device 110 that controls respective devices, the smart meter 107, and sensors 111 which acquire various pieces of information are provided in the house 101. The respective devices are connected by the power network 109 and the information network 112. As the in-house power generator 104, a solar cell, a fuel cell, or the like is used, and a generated output is supplied to the power-consuming devices 105 and/or the electrical storage device 103. Examples of the power-consuming devices 105 include a refrigerator 105a, an air-conditioner 105b, a television receiver (television) 105c, a bath 105d, and the like. In addition, examples of the power-consuming device 105 include an electrically driven vehicle 106. Examples of the electrically driven vehicle 106 include an electric vehicle 106a, a hybrid car 106b, and an electric bike 106c.

The electrical storage device 103 is constituted by a secondary battery or a capacitor. For example, the electrical storage device 103 is constituted by a lithium ion secondary battery. As the electrical storage device 103, a plurality of electrical storage modules can be used. The lithium ion secondary battery may be a stationary type or a battery that is used in the electrically driven vehicle 106. The smart meter 107 has a function of measuring a used amount of a commercial power and of transmitting the used amount that is measured to a power company. The power network 109 may be any one of a DC power supply type, an AC power supply type, and a non-contact power supply type, or a combination thereof.

Examples of the various sensors 111 include a motion sensing sensor, a luminance sensor, an object sensing sensor, a power-consumption sensor, a vibration sensor, a contact sensor, a temperature sensor, an infrared sensor, and the like. Information acquired by the various sensors 111 is transmitted to the control device 110. Weather conditions, conditions of human, or the like is grasped by the information transmitted from the sensors 111, and the power-consuming devices 105 are automatically controlled. Therefore, it is possible to minimize the energy-consumption. In addition, the control device 110 may transmit information related to the house 101 to an external power company or the like through the Internet.

Processes such as divergence of power lines and DC-AC conversion are performed by the power hub 108. Examples of a communication method of the information network 112 connected to the control device 110 include a method using a communication interface such as a universal asynchronous receiver-transmitter (UART: transmission and reception circuit for asynchronous serial communication), and a method using a sensor network compliant to a wireless communication standard such as Bluetooth (registered trademark), ZigBee (registered trademark), and Wi-Fi (registered trademark). The Bluetooth (registered trademark) method is applied to a multimedia communication and can perform a one-to-multi-connection communication. The ZigBee uses a physical layer of institute of electrical and electronics engineers (IEEE) 802.15.4. IEEE 802.15.4 is the name of a short-range wireless network standard called a personal area network (PAN) or wireless (W) PAN.

The control device 110 is connected to an external server 113. The server 113 may be managed by any one of the house 101, the power company, and a service provider. Examples of information that is transmitted to and received from the server 113 include power-consumption information, life pattern information, power rates, weather information, disaster information, and information related to power transaction. These kinds of information may be transmitted to and received from in-house power-consuming devices (for example, a television receiver), but may be transmitted to and received from devices (for example, a cellular phone, and the like) located on an outer side of the house. These kinds of information may be displayed on a device having a display function, for example, a television receiver, a cellular phone, a personal digital assistant (PDA), and the like.

The control device 110 that controls each unit includes a CPU, a RAM, a ROM, and the like, and is accommodated in the electrical storage device 103 in this example. As a function of the control device 110, for example, a function of the monitoring unit 27 and the like, or a function of the controller 83 and the like is applicable. The control device 110 is connected to the electrical storage device 103, the in-house power generator 104, the power-consuming devices 105, the various sensors 111, and the server 113 through the information network 112, and has, for example, a function of adjusting the amount of commercial power used and the amount of power generation. Furthermore, in addition to this function, the control device 110 may have a function of performing power transaction in a power market, and the like.

As described above, a generated output of the in-house power generator 104 (photovoltaic generation and wind power generation) as well as the centralized power system 102 such as the thermal generation 102a, the nuclear power generation 102b, and the hydraulic power generation 102c may be stored in the electrical storage device 103. Accordingly, even when the generated output of the in-house power generator 104 varies, it is possible to make the amount of power transmitted to an outer side uniform, or it is possible to control discharging as much as necessary. For example, a usage method described below may be considered. Specifically, the electric power that is obtained from the photovoltaic generation is stored in the electrical storage device 103, and inexpensive midnight power is also stored in the electrical storage device 103 at night, and then the electric power that is stored in the electrical storage device 103 is discharged to be used in a period of time at which a rate is expensive in the day time.

Furthermore, in this example, description has been given of an example in which the control device 110 is accommodated in the electrical storage device 103, but the control device 110 may be accommodated in the smart meter 107, or may be configured independently. Furthermore, the electrical storage device 100 may be used in a plurality of homes as targets in regard to an apartment house, or may be used in a plurality of detached houses as targets.

Application Example 2

Figure 12:
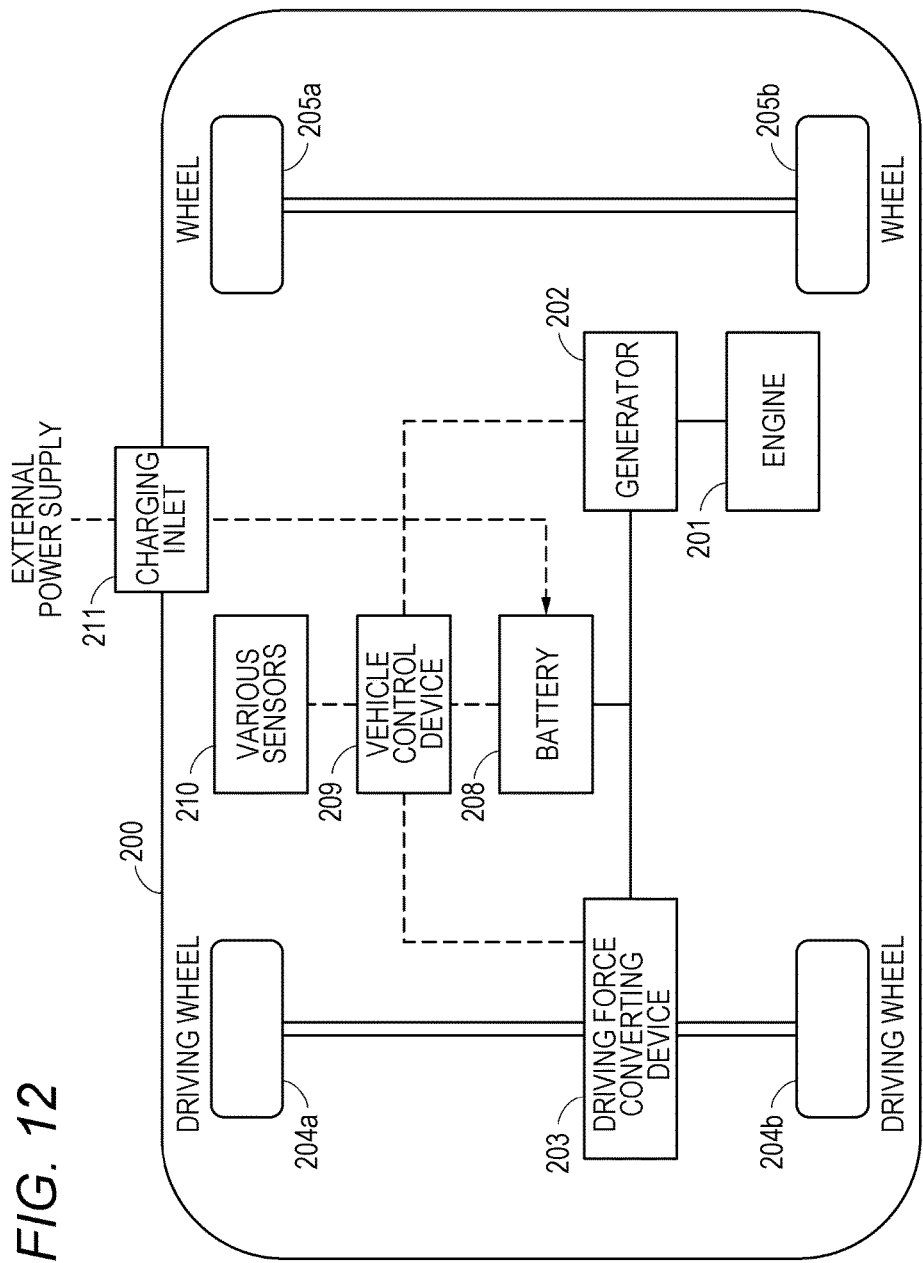
FIG. 12 is a block diagram of a second example of the application example of the present technology.

Description will be given of an example in which the present technology is applied to an electrical storage device for a vehicle with reference to FIG. 12. FIG. 12 schematically illustrates an example of a configuration of a hybrid car that employs a series hybrid system to which the present technology is applied. The series hybrid system relates to a vehicle that uses electric power generated by a generator moved by an engine and electric power or the electric power stored at once in a battery, and travels with a power-driving force converting device.

In the hybrid car 200, an engine 201, a generator 202, a power-driving force converting device 203, a driving wheel 204a, a driving wheel 204b, a wheel 205a, a wheel 205b, a battery 208, a vehicle control device 209, various sensors 210, and a charging inlet 211 are mounted. As the battery 208, an electrical storage module is applicable.

The hybrid car 200 may be kept outdoors in many cases. In a mountain area in winter, an external temperature may lower to approximately −20° C. Even in this environment, it is possible to correctly determine a state (degree of deterioration) of the battery 208 according to the present technology.

The hybrid car 200 travels using the power-driving force converting device 203 as a power source. An example of the power-driving force converting device 203 is a motor. The power-driving force converting device 203 operates by electric power of the battery 208 and torque of the power-driving force converting device 203 is transferred to the driving wheels 204a and 204b. In addition, the power-driving force converting device 203 is applicable to an AC motor or a DC motor by using a DC-AC conversion or an invert conversion (AC-DC conversion) as necessary. The various sensors 210 control an engine speed or an opening degree (throttle opening degree) of a throttle valve (not shown) through the vehicle control device 209. Examples of the various sensors 210 include a speed sensor, an acceleration sensor, an engine speed sensor, and the like.

The torque of the engine 201 is transferred to the generator 202, and electric power generated by the generator 202 using the torque may be stored in the battery 208.

When the hybrid car is decelerated by a brake mechanism (not shown), resistance force during the deceleration is added to the power-driving force converting device 203 as torque, and regenerated electric power generated by the power-driving force converting device 203 due to the torque is stored in the battery 208.

When the battery 208 is connected to an external power supply on an outer side of the hybrid car, electric power may be supplied to the battery 208 from the external power supply by using the charging inlet 211 as an input inlet and the battery 208 may store the supplied electric power.

Although not shown, an information processing device that performs an information processing related to a vehicle control on the basis of information related to the secondary battery may be provided. Example of the information processing device include an information processing device that performs display of a residual amount of a battery on the basis of information about the residual amount of the battery, and the like.

As the function of the vehicle control device 209, for example, the function of the controller 83 is applicable.

In addition, hereinbefore, description has been given of the series hybrid car that travels with a motor by using electric power generated by a generator moved by an engine, or the electric power that is temporarily stored in a battery as an example. However, the present technology is effectively applicable to a parallel hybrid car that uses both the output of the engine and the output of the motor as driving sources, and utilizes three types of traveling using the engine only, traveling using the motor only, and traveling using the engine and motor by appropriately changing these types. In addition, the present technology is effectively applicable to a so-called electrically driven vehicle that travels using driving by a driving motor only without using the engine.

4. Modification Example

The present technology is not limited to the embodiments of the present technology, and various modifications and applications can be made in a range not departing from the gist of the present technology.

For example, the dimensions, the structures, the shapes, the materials, the raw materials, the manufacturing processes, and the like, which are exemplified in the above-described embodiments, are illustrative only, and other dimensions, structures, shapes, materials, raw materials, manufacturing processes, and the like, which are different from those which are exemplified, may be used as necessary.

In addition, the configurations, the methods, the processes, the shapes, the materials, the dimensions, and the like of the above-described embodiments and examples may be combined with each other in a range not departing from the gist of the present technology.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The present technology can employ the following configurations.

[1]

An electrical storage system, including:

an electrical storage unit that includes one or two or more storage batteries;

a storage unit that stores historical information of the electrical storage unit; and a control unit that acquires the historical information from the storage unit, and performs a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value, in which the voltage changing condition is at least one of a condition in which the number of charging and discharging cycles, which are performed with the typical-charging voltage value, in the electrical storage unit is greater than a predetermined number of cycles, a condition in which out-of-temperature-range accumulated time, for which the electrical storage unit is used out of a typical-use temperature range, is greater than a threshold value, a condition in which internal resistance is greater than a predetermined value, a condition in which full-charging capacity is reduced from initial capacity by a predetermined value, and a condition of exceeding over passed accumulated time that is predicted by lifespan prediction.

[2]

The electrical storage system according to [1], in which the control unit performs changing from the low-charging voltage value to the typical-charging voltage value after the electrical storage unit performs one cycle to five cycles of charging and discharging with the low-charging voltage value.

[3]

The electrical storage system according to [1] or [2], in which the predetermined number of cycles is 500 cycles to 1000 cycles.

[4]

The electrical storage system according to any one of [1] to [3], in which the low-charging voltage value is a value that is lower than the typical voltage value by 0.1 V to 0.2 V.

[5]

The electrical storage system according to any one of [1] to [4], in which in a case where the condition in which out-of-temperature-range accumulated time is greater than a threshold value is satisfied as the voltage changing condition, the control unit performs changing to the typical-charging voltage value after the electrical storage unit is left in a typical-use temperature range.

[6]

The electrical storage system according to any one of [1] to [5], further including:

a display unit that displays the amount of charging of the electrical storage unit, in which in charging and discharging that is performed with the low-charging voltage value, display indicating full-charging is performed on the display unit when charging is completed.

[7]

The electrical storage system according to any one of [1] to [6], in which in a case where the electrical storage unit includes two or more storage batteries, the control is performed in a unit of storage battery.

[8]

The electrical storage system according to any one of [1] to [6], in which in a case where the electrical storage unit includes a plurality of assembled batteries constituted by two or more storage batteries, the control is performed in a unit of assembled battery.

[9]

The electrical storage system according to any one of [1] to [8], further including:

a condition setting unit that sets a temperature T for calculation, a condition of a battery state S for calculation, and a condition of float charging, in which the control unit performs calculation of a deterioration prediction value after (X+Y) days from initial charging from deterioration master data with respect to the electrical storage unit having a deterioration rate R at a point of time after passage of X days from the initial charging, the storage unit stores a plurality of pieces of the deterioration master data, the control unit specifies the deterioration master data by using conditions which are set by the condition setting unit, and in the deterioration master data that is specified, days of passage Xcorr, which applies the deterioration rate R, is derived, and the deterioration prediction value after (Xcorr+Y) days from the initial charging is obtained from the deterioration master data that is specified.

[10]

The electrical storage system according to [9], in which the conditions in estimation for Y days include n conditions $(Z_1, Z_2, \ldots, Z_n)$ $(1 \leq n)$, and in transitioning from first deterioration master data that is specified by the condition $Z_{n-2}$ into second deterioration master data that is specified by the condition $Z_n$, the transitioning is performed so that a final deterioration rate in the first deterioration master data becomes an initiation deterioration rate in the second deterioration master data.

[11]

The electrical storage system according to any one of [1] to [10], in which the storage battery is a lithium ion secondary battery that uses at least one of a lithium-transition metal phosphate compound having an olivine type structure, and a lithium-transition metal composite oxide having a layered rock salt structure as a positive electrode active material.

[12]

The electrical storage system according to any one of [1] to [11], in which electric power is supplied from the electrical storage unit to a power network and/or a power generator, and the electric power is supplied from the power network and/or the power generator to the electrical storage unit.

[13]

A controller, including:

a control unit that acquires the historical information of an electrical storage unit including one or two or more storage batteries, and performs a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value, in which the voltage changing condition is at least one of a condition in which the number of charging and discharging cycles, which are performed with the typical-charging voltage value, in the electrical storage unit is greater than a predetermined number of cycles, a condition in which out-of-temperature-range accumulated time, for which the electrical storage unit is used out of a typical-use temperature range, is greater than a threshold value, a condition in which internal resistance is greater than a predetermined value, a condition in which full-charging capacity is reduced from initial capacity by a predetermined value, and a condition of exceeding over passed accumulated time that is predicted by lifespan prediction.

[14]

A storage battery charging and discharging method, including:

acquiring the historical information of an electrical storage unit including one or two or more storage batteries; and performing a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value, in which the voltage changing condition is at least one of a condition in which the number of charging and discharging cycles, which are performed with the typical-charging voltage value, in the electrical storage unit is greater than a predetermined number of cycles, a condition in which out-of-temperature-range accumulated time, for which the electrical storage unit is used out of a typical-use temperature range, is greater than a threshold value, a condition in which internal resistance is greater than a predetermined value, a condition in which full-charging capacity is reduced from initial capacity by a predetermined value, and a condition of exceeding over passed accumulated time that is predicted by lifespan prediction.

REFERENCE SIGNS LIST

35 Sub-micro control unit
36 Storage unit
40 Main micro control unit
81 Electrical storage system
82 Electrical storage module
83 Controller
84 Electrical storage device
85 Load
SMO Sub-module

The invention claimed is:

1. An electrical storage system, comprising: an electrical storage unit that includes one or two or more storage batteries; a storage unit that stores historical information of the electrical storage unit; and a control unit that acquires the historical information from the storage unit, and performs a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value, wherein the voltage changing condition is at least one of a condition in which the number of charging and discharging cycles, which are performed with the typical-charging voltage value, in the electrical storage unit is greater than a predetermined number of cycles, a condition in which out-of-temperature-range accumulated time, for which the electrical storage unit is used out of a typical-use temperature range, is greater than a threshold value, a condition in which internal resistance is greater than a predetermined value, a condition in which full-charging capacity is reduced from initial capacity by a predetermined value, and a condition of exceeding over passed accumulated time that is predicted by lifespan prediction; and a condition setting unit that sets a temperature T for calculation, a condition of a battery state S for calculation, and a condition of float charging, wherein the control unit performs calculation of a deterioration prediction value after (X+Y) days from initial charging from deterioration master data with respect to the electrical storage unit having a deterioration rate R at a point of time after passage of X days from the initial charging, the storage unit stores a plurality of pieces of the deterioration master data, the control unit specifies the deterioration master data by using conditions which are set by the condition setting unit, and in the deterioration master data that is specified, days of passage Xcorr, which applies the deterioration rate R, is derived, and the deterioration prediction value after (Xcorr+Y) days from the initial charging is obtained from the deterioration master data that is specified.

2. The electrical storage system according to claim 1, wherein the control unit performs changing from the low-charging voltage value to the typical-charging voltage value after the electrical storage unit performs one cycle to five cycles of charging and discharging with the low-charging voltage value.

3. The electrical storage system according to claim 1, wherein the predetermined number of cycles is 500 cycles to 1000 cycles.

4. The electrical storage system according to claim 1, wherein the low-charging voltage value is a value that is lower than the typical voltage value by 0.1 V to 0.2 V.

5. The electrical storage system according to claim 1, wherein in a case where the condition in which out-of-temperature-range accumulated time is greater than a threshold value is satisfied as the voltage changing condition,
the control unit performs changing to the typical-charging voltage value after the electrical storage unit is left in a typical-use temperature range.

6. The electrical storage system according to claim 1, further comprising:
a display unit that displays the amount of charging of the electrical storage unit,
wherein in charging and discharging that is performed with the low-charging voltage value, display indicating full-charging is performed on the display unit when charging is completed.

7. The electrical storage system according to claim 1, wherein in a case where the electrical storage unit includes two or more storage batteries,
the control is performed in a unit of storage battery.

8. The electrical storage system according to claim 1, wherein in a case where the electrical storage unit includes a plurality of assembled batteries constituted by two or more storage batteries,
the control is performed in a unit of assembled battery.

9. The electrical storage system according to claim 1, wherein the conditions in estimation for Y days include n conditions ($Z_1, Z_2, \ldots, Z_n$) ($1 \le n$), and
in transitioning from first deterioration master data that is specified by the condition $Z_{n-1}$ into second deterioration master data that is specified by the condition $Z_n$, the transitioning is performed so that a final deterioration rate in the first deterioration master data becomes an initiation deterioration rate in the second deterioration master data.

10. The electrical storage system according to claim 1, wherein the storage battery is a lithium ion secondary battery that uses at least one of a lithium-transition metal phosphate compound having an olivine type structure, and a lithium-transition metal composite oxide having a layered rock salt structure as a positive electrode active material.

11. The electrical storage system according to claim 1, wherein electric power is supplied from the electrical storage unit to a power network and/or a power generator, and the electric power is supplied from the power network and/or the power generator to the electrical storage unit.

12. A controller, comprising: a control unit that acquires the historical information of an electrical storage unit including one or two or more storage batteries, and performs a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value, wherein the voltage changing condition is at least one of a condition in which the number of charging and discharging cycles, which are performed with the typical-charging voltage value, in the electrical storage unit is greater than a predetermined number of cycles, a condition in which out-of-temperature-range accumulated time, for which the electrical storage unit is used out of a typical-use temperature range, is greater than a threshold value, a condition in which internal resistance is greater than a predetermined value, a condition in which full-charging capacity is reduced from initial capacity by a predetermined value, and a condition of exceeding over passed accumulated time that is predicted by lifespan prediction; and a condition setting unit that sets a temperature T for calculation, a condition of a battery state S for calculation, and a condition of float charging, wherein the control unit performs calculation of a deterioration prediction value after (X+Y) days from initial charging from deterioration master data with respect to the electrical storage unit having a deterioration rate R at a point of time after passage of X days from the initial charging, the storage unit stores a plurality of pieces of the deterioration master data, the control unit specifies the deterioration master data by using conditions which are set by the condition setting unit, and in the deterioration master data that is specified, days of passage Xcorr, which applies the deterioration rate R, is derived, and the deterioration prediction value after (Xcorr+Y) days from the initial charging is obtained from the deterioration master data that is specified.

13. A storage battery charging and discharging method, comprising: acquiring the historical information of an electrical storage unit including one or two or more storage batteries; and performing a control of changing a charging setting voltage value of the electrical storage unit to a low-charging voltage value lower than a typical-charging voltage value in a case where the charging setting voltage value of the electrical storage unit is set to the typical-charging voltage value and in a case where the historical information satisfies a voltage changing condition, and of returning the charging setting voltage value of the electrical storage unit to the typical-charging voltage value after the electrical storage unit performs charging and discharging with the low-charging voltage value, wherein the voltage changing condition is at least one of a condition in which the number of charging and discharging cycles, which are performed with the typical-charging voltage value, in the electrical storage unit is greater than a predetermined number of cycles, a condition in which out-of-temperature-range accumulated time, for which the electrical storage unit is used out of a typical-use temperature range, is greater than a threshold value, a condition in which internal resistance is greater than a predetermined value, a condition in which full-charging capacity is reduced from initial capacity by a predetermined value, and a condition of exceeding over passed accumulated time that is predicted by lifespan prediction; and a condition setting unit that sets a temperature T for calculation, a condition of a battery state S for calculation, and a condition of float charging, wherein the control unit performs calculation of a deterioration prediction value after (X+Y) days from initial charging from deterioration master data with respect to the electrical storage unit having a deterioration rate R at a point of time after passage of X days from the initial charging, the storage unit stores a plurality of pieces of the deterioration master data, the control unit specifies the deterioration master data by using conditions which are set by the condition setting unit, and in the deterioration master data that is specified, days of passage Xcorr, which applies the deterioration rate R, is derived, and the deterioration prediction value after (Xcorr+Y) days from the initial charging is obtained from the deterioration master data that is specified.

* * * * *